US012645105B2

(12) United States Patent
Chern et al.

(10) Patent No.: US 12,645,105 B2
(45) Date of Patent: Jun. 2, 2026

(54) OPTICAL PULSE AMPLITUDE MODULATOR (PAM) WITH MULTIPLE MODULATOR SEGMENTS

(71) Applicant: Taiwan Semiconductor Manufacturing Company, Ltd., Hsinchu (TW)

(72) Inventors: Chan-Hong Chern, Palo Alto, CA (US); Chih-Chang Lin, San Jose, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 444 days.

(21) Appl. No.: 18/184,004

(22) Filed: Mar. 15, 2023

(65) Prior Publication Data
US 2024/0310661 A1 Sep. 19, 2024

(51) Int. Cl.
*G02F 1/025* (2006.01)
*G02F 1/01* (2006.01)

(52) U.S. Cl.
CPC ............ *G02F 1/025* (2013.01); *G02F 1/0147* (2013.01)

(58) Field of Classification Search
CPC ............................... G02F 1/025; G02F 1/0147
See application file for complete search history.

(56) References Cited

U.S. PATENT DOCUMENTS

| | | | | |
|---|---|---|---|---|
| 8,014,636 B2 * | 9/2011 | Shubin | ................ | G02F 1/01708 385/132 |
| 8,027,587 B1 * | 9/2011 | Watts | ................ | G02B 6/12007 359/107 |
| 8,937,981 B2 * | 1/2015 | Liang | ................ | H01S 5/06213 372/29.013 |

(Continued)

FOREIGN PATENT DOCUMENTS

| | | |
|---|---|---|
| CN | 109314678 A | 2/2019 |
| CN | 113904731 A | 1/2022 |

OTHER PUBLICATIONS

Yuan et al., A 100Gb/s PAM4 Two-Segment Silicon Microring Resonator Modulator Using a Standard Foundry Process, ACS Photonics Mar. 1, 2022, 9, 1165-1171 (Year: 2022).*

(Continued)

*Primary Examiner* — Peter Radkowski

(74) *Attorney, Agent, or Firm* — Eschweiler & Potashnik, LLC

(57) ABSTRACT

Various embodiments of the present disclosure are directed towards an optical module comprising an optical modulator device (OMD) for pulse amplitude modulation (PAM) in which the OMD comprises multiple modulator segments. A first modulator segment and a second modulator segment are spaced from each other along a ring-shaped waveguide. Further, a length of the second modulator segment is twice a length of the first modulator segment. As such, a power factor of the second modulator segment is twice a power factor of the first modulator segment. During use of the (Continued)

OMD, the first and second modulator segments are driven by separate non-return-to-zero (NRZ) electrical signals. The NRZ electrical signals are generated by a driver, which generates the NRZ electrical signals so as to coordinate operation of the first and second modulator segments to generate a PAM optical signal.

20 Claims, 20 Drawing Sheets

(56)                    References Cited

U.S. PATENT DOCUMENTS

| | | | | |
|---|---|---|---|---|
| 9,541,775 | B2 * | 1/2017 | Ayazi | G02F 1/2257 |
| 9,548,818 | B2 * | 1/2017 | Fujikata | G02F 1/2257 |
| 10,241,354 | B1 * | 3/2019 | Gill | G02F 1/01708 |
| 10,381,801 | B1 * | 8/2019 | Liang | H01S 5/18377 |
| 10,642,077 | B1 * | 5/2020 | Andy | H10D 1/66 |
| 12,242,142 | B2 * | 3/2025 | Yuan | G02F 1/025 |
| 2010/0215309 | A1 * | 8/2010 | Shubin | G02F 1/01708 |
| | | | | 385/2 |
| 2014/0286647 | A1 * | 9/2014 | Ayazi | G02F 1/2257 |
| | | | | 398/139 |
| 2014/0314109 | A1 * | 10/2014 | Liang | H01S 5/06203 |
| | | | | 372/38.05 |
| 2015/0280832 | A1 * | 10/2015 | Fujikata | G02F 1/2257 |
| | | | | 398/25 |
| 2017/0176780 | A1 * | 6/2017 | Levy | G02B 6/29338 |
| 2017/0184883 | A1 * | 6/2017 | Sun | G02F 1/025 |
| 2017/0257170 | A1 * | 9/2017 | Nakahara | G02F 1/011 |
| 2020/0159048 | A1 * | 5/2020 | Andy | H10D 1/048 |
| 2021/0003904 | A1 | 1/2021 | Dorta-Quinones et al. | |
| 2021/0336414 | A1 * | 10/2021 | Harris | G02B 6/12019 |
| 2023/0350238 | A1 * | 11/2023 | Yuan | G02F 1/2257 |

OTHER PUBLICATIONS

Sun et al., A 128 GB/s PAM4 Silicon Microring Modulator With Integrated Thermo-Optic Resonance Tuning, in Journal of Lightwave Technology, vol. 37, No. 1, pp. 110-115, Jan. 1, 2019, doi: 10.1109/JLT.2018.2878327. (Year: 2019).*

Roshan-Zamir et al., A two-segment optical DAC 40 GB/s PAM4 silicon microring resonator modulator transmitter in 65nm CMOS, 2017 IEEE Optical Interconnects Conference (OI), Santa FE, NM, USA, 2017, pp. 5-6, doi: 10.1109/OIC.2017.7965503. (Year: 2017).*

* cited by examiner

1000B 818  1002  806  804  110  114  112

124

816

104b/104

802

C  C' z x y 812  814  810  808

1000C 818  820  806  804  1002

124

816

104c/104

802

D  D' z y x 812  814  808  810  122  104a/104  816

2000A

2000B

2100

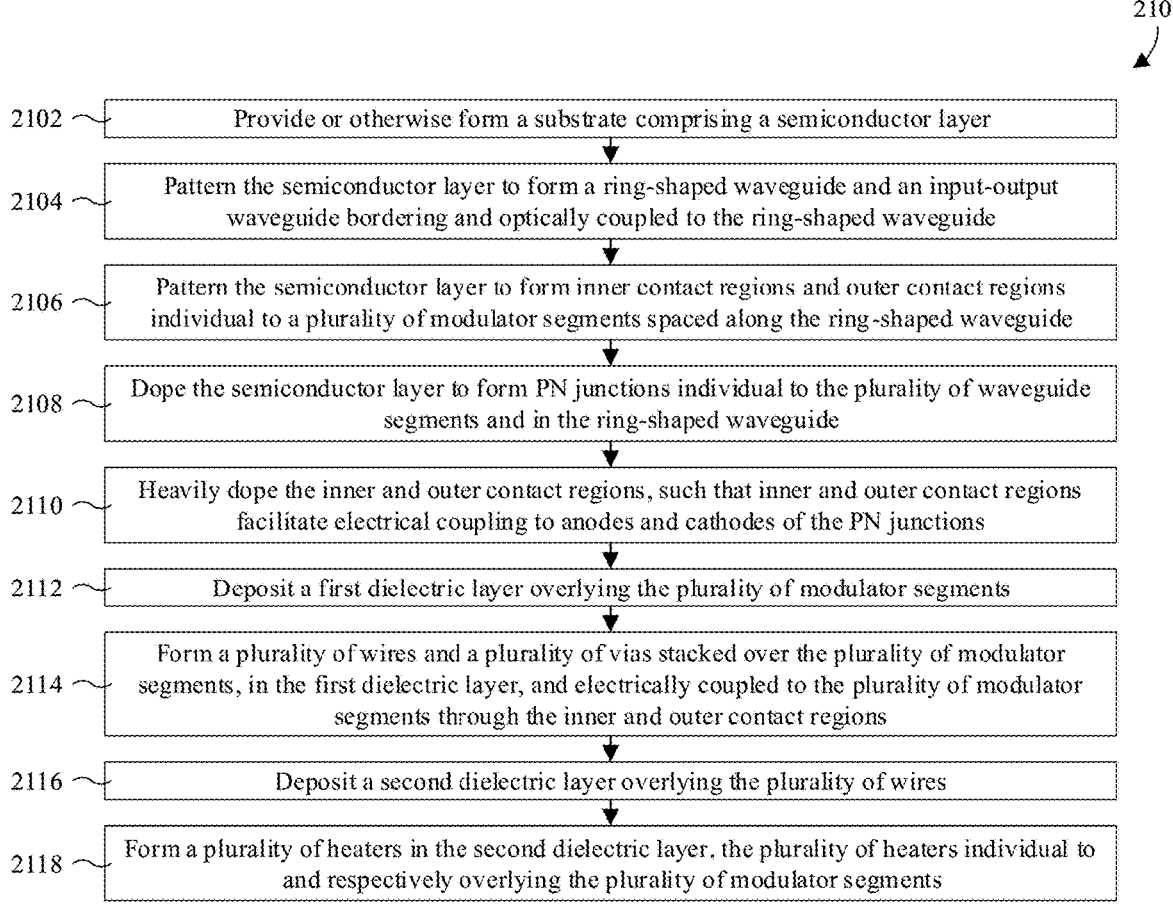

2102 — Provide or otherwise form a substrate comprising a semiconductor layer

2104 — Pattern the semiconductor layer to form a ring-shaped waveguide and an input-output waveguide bordering and optically coupled to the ring-shaped waveguide 2106 — Pattern the semiconductor layer to form inner contact regions and outer contact regions individual to a plurality of modulator segments spaced along the ring-shaped waveguide 2108 — Dope the semiconductor layer to form PN junctions individual to the plurality of waveguide segments and in the ring-shaped waveguide 2110 — Heavily dope the inner and outer contact regions, such that inner and outer contact regions facilitate electrical coupling to anodes and cathodes of the PN junctions 2112 — Deposit a first dielectric layer overlying the plurality of modulator segments 2114 — Form a plurality of wires and a plurality of vias stacked over the plurality of modulator segments, in the first dielectric layer, and electrically coupled to the plurality of modulator segments through the inner and outer contact regions 2116 — Deposit a second dielectric layer overlying the plurality of wires 2118 — Form a plurality of heaters in the second dielectric layer, the plurality of heaters individual to and respectively overlying the plurality of modulator segments

Fig. 21

OPTICAL PULSE AMPLITUDE MODULATOR (PAM) WITH MULTIPLE MODULATOR SEGMENTS

BACKGROUND

At high frequencies or high data rates, electrical transmission is reaching its limit due to high energy loss over long distances. As such, electrical chips that depend on long distance transmission are turning to optical transmission. Such electrical chips may, for example, include switch chips or system-on-chip (SoC) chips. Such SoC chips may, for example, include application-specific integrated circuit (ASIC) chips, central processing unit (CPU) chips, graphics processing unit (GPU) chips, and so on.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 15A and 15B to FIGS. 20A and 20B illustrate a series of views of some embodiments of a method for forming an OMD for PAM in which the OMD comprises a plurality of modulator segments.

FIG. 21 illustrates a block diagram of some embodiments of the method of FIGS. 15A and 15B to FIGS. 20A and 20B.

DETAILED DESCRIPTION

Figure 1:
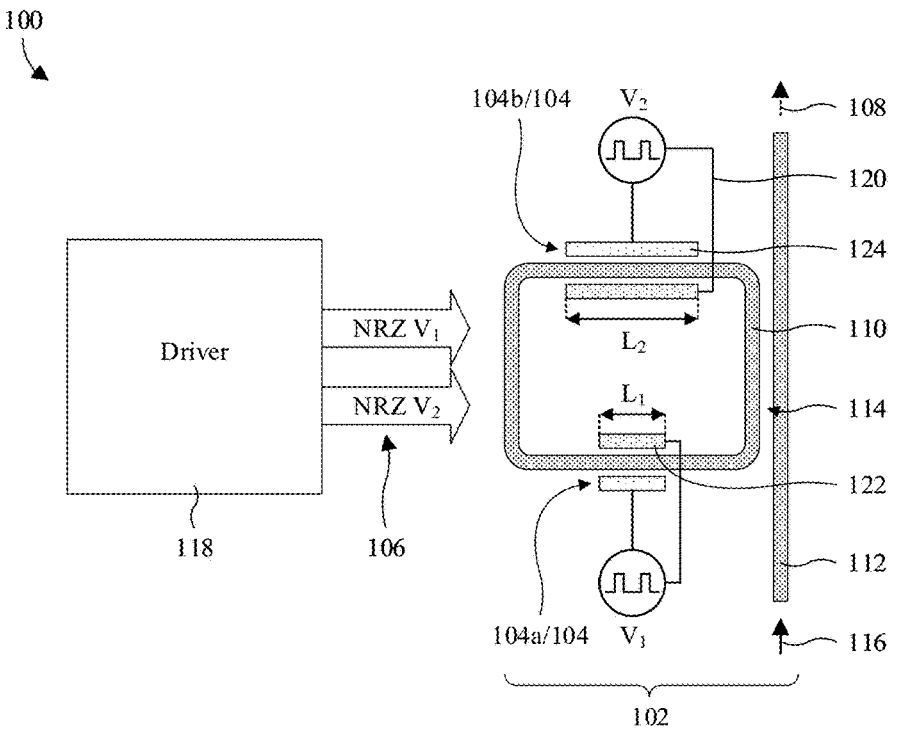
FIG. 1 illustrates a schematic view of some embodiments of an optical module comprising an optical modulator device (OMD) for pulse amplitude modulation (PAM) in which the OMD comprises two modulator segments.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An optical module may comprise a complementary metal-oxide-semiconductor (CMOS) driver and an optical modulator device (OMD). The CMOS driver generates a digital electrical signal, and the OMD converts the digital electrical signal to a digital optical signal. To increase the bit rate, the baud rate of the digital electrical signal may be increased. The baud rate may, for example, correspond to the number of pulses per second, whereas the bit rate may, for example, correspond to the number of bits per second. However, the baud rate is reaching its upper limit due to the cutoff frequency ($f_c$) limit of CMOS devices.

Because of the baud rate limit, pulse amplitude modulation (PAM) may be used to further increase the bit rate. PAM uses amplitude modulation to encode multiple bits per pulse and has four or more amplitude levels. For example, PAM-4 has four amplitude levels and encodes two bits per pulse. PAM is to be contrast with non-return-to-zero (NRZ), which encodes a single bit per pulse and has only two amplitude levels.

PAM OMDs generate a digital optical signal using PAM based on a digital electrical signal using PAM. However, such PAM OMDs suffer from non-linearity when converting the digital electrical signal (the input) to the digital optical signal (the output). Further, generation of the digital electrical signal suffers from non-linearity. Particularly, an amplifier of the CMOS driver may have nonlinearity between an input and an output. The non-linearity reduces the uniformity in spacing between the amplitude levels of the digital optical signal and hence makes decoding the digital optical signal more prone to error.

In addition to non-linearity, generation of the digital electrical depends on an analog-to-digital-converter (ADC) circuit and a digital signal processing (DSP) circuit. The ADC circuit and the DSP circuit have high power requirements, whereby the CMOS driver may have low power efficiency. Further, the ADC circuit and the DSP circuit add cost.

Various embodiments of the present disclosure relate to an optical module comprising a PAM OMD with multiple modulator segments. In some embodiments, the PAM OMD comprises a ring-shaped waveguide, and further comprises a first modulator segment and a second modulator segment spaced from each other along the ring-shaped waveguide. Further, a length of the second modulator segment is twice a length of the first modulator segment. As a result of the two-to-one length ratio, a power factor of the second modulator segment is twice a power factor of the first modulator segment. Hence, the second modulator segment increases optical amplitude by twice an amount that the first modulator segment does when in an ON state.

The first and second modulator segments are driven by separate NRZ electrical signals from a driver (e.g., a CMOS driver or the like) of the optical module. Because of the separate NRZ electrical signals, the PAM OMD has four modulation states: 1) the first and second modulator segments are OFF; 2) the first modulator segment is ON and the second modulator segment is OFF; 3) the second modulator segment is ON and the first modulator segment is OFF; and 4) the first and second modulator segments are ON.

It has been appreciated that amplitude modulation by the first and second modulator segments is additive. Because the amplitude modulation is additive, and because the first and second modulator segments have different ON amplitudes as described above, the four modulation states described above correspond to four different optical amplitudes. Hence, the separate NRZ electrical signals may drive the first and second modulator segments to achieve a PAM-4 optical signal. Further, with additional NRZ electrical signals and additional modulator segments, each having a length that is twice that of another modulator segment, PAM-8, PAM-16, and even higher PAM levels may be achieved. Indeed, PAM-N may be achieved with $\log_2(N)$ modulator segments and $\log_2(N)$ NRZ electrical signals, where N is power of 2.

Because NRZ electrical signals are used, ADC circuits and DSP circuits may be omitted and hence power efficiency may be high. Further, amplifiers of the CMOS driver may have linearity between an input and an output.

With reference to FIG. 1, a schematic view 100 of some embodiments of an optical module comprising an OMD 102 for PAM is provided in which the OMD 102 comprises a plurality of modulator segments 104. The plurality of modulator segments 104 comprise a first modulator segment 104a and a second modulator segment 104b. Further, the plurality of modulator segments 104 are driven by NRZ electrical signals 106 to generate a PAM optical signal 108 and are spaced along a ring-shaped waveguide 110. The PAM optical signal 108 may also be referred to as PAM modulated light or the like.

The ring-shaped waveguide 110 extends in a closed path around a central area and is optically coupled to the input-output waveguide 112 at a coupling area 114. Such optical coupling allows light to pass between the ring-shaped waveguide 110 and the input-output waveguide 112. The input-output waveguide 112 is configured to receive light 116 and to output modulated light carrying the PAM optical signal 108.

The ring-shaped waveguide 110 and the input-output waveguide 112 have a resonant frequency at which light resonates in the ring-shaped waveguide 110. Light at the resonant frequency constructively interferes and passes to an output of the input-output waveguide 112. Light offset from the resonant frequency undergoes destructive interference and hence does not pass to, or only minimally passes to, the output of the input-output waveguide 112. Hence, the OMD 102 filters out light offset from the resonant frequency.

During use of the OMD 102, the plurality of modulator segments 104 modulate the resonant frequency. Supposing a wavelength of the light 116 is fixed at or near the resonant frequency, modulating the resonant frequency may modulate the optical amplitude of light passing to the output of the input-output waveguide 112. Shifting the resonant frequency towards the wavelength of the light 116 increases the amplitude, whereas shifting the resonant frequency away from the wavelength decreases the amplitude.

The NRZ electrical signals 106 correspond to the plurality of modulator segments 104 (e.g., with a one-to-one correspondence or the like). For example, the NRZ electrical signals 106 comprise a first NRZ electrical signal $V_1$ and a second NRZ electrical signal $V_2$ corresponding to the first modulator segment 104a and the second modulator segment 104b. Further, the NRZ electrical signals 106 are generated by a driver 118 and are provided to the plurality of modulator segments 104 via corresponding driver-signal lines 120. An NRZ signal corresponds to a digital signal using amplitude to encode a single bit per pulse and having only two amplitude levels. In contrast, a PAM signal corresponds to a digital signal using amplitude to encode multiple bits per pulse and having more than two amplitude levels. Hence, for a given baud rate, a PAM signal may have a higher bit rate than a NRZ signal.

Because multiple NRZ electrical signals, instead of a single PAM electrical signal, are used to generate the PAM optical signal 108, the driver 118 is less complex and more power efficient. ADC circuits and DSP circuits may be omitted. Further, amplifiers of the driver 118 may have linearity between an input and an output.

Because the plurality of modulator segments 104 are driven by the corresponding NRZ electrical signals 106, each modulator segments has an ON state and an OFF state. In an ON state, a modulator segment increases the amplitude of a corresponding optical signal by a corresponding amount. In an OFF state, a modulator segment passes the corresponding optical signal without affecting the amplitude of the optical signal.

Because the plurality of modulator segments 104 each have two states, and are driven by separate NRZ electrical signals 106, the OMD 102 has $2^X$ different modulation states, where X is a total number of modulator segments. For example, the OMD 102 has two modulator segments as illustrated, whereby X=2 and the OMD 102 has four modulation states. These four modulation states are: 1) the first and second modulator segments 104a, 104b are OFF; 2) the first modulator segment 104a is ON and the second modulator segment 104b is OFF; 3) the second modulator segment 104b is ON and the first modulator segment 104a is OFF; and 4) the first and second modulator segments 104a, 104b are ON.

Each of the plurality of modulator segments 104 has a different length than each other modulator segment. Further, each of the plurality of modulator segments 104, except a shortest modulator segment amongst the plurality of modulator segments 104, has a length along the ring-shaped waveguide 110 that is twice a length of another one of the plurality of modulator segments 104. For example, the first modulator segment 104a has a length $L_1$ that is shortest amongst the plurality of modulator segments 104, and the second modulator segment 104b has a length $L_2$ that is twice the length $L_1$ of the first modulator segment 104a.

Because of the two-to-one length ratios, each of the plurality of modulator segments 104 has a different power factor than each other power modulator. Further, each of the plurality of modulator segments 104, except the shortest modulator segment, has a power factor that is twice a power factor of another one of the plurality of modulator segments 104. For example, the second modulator segment 104b has a power factor that is twice a power factor of the first modulator segment 104a. Power factor corresponds to an amount that a modulator segment increases an amplitude of a corresponding optical signal when ON and, as noted above, corresponds to a shift in a resonant frequency of the ring-shaped waveguide 110.

It has been appreciated that amplitude modulation by the plurality of modulator segments 104 is additive. Because the amplitude modulation is additive, and because the plurality of modulator segments 104 have different power factors related to each other by powers of 2, the $2^X$ different modulation states correspond to $2^X$ different amplitudes, where X is a total number of modulator segments. Hence, the separate NRZ electrical signals 106 may drive the plurality of modulator segments 104 so generate the PAM optical signal 108 with PAM-N, where $N=2^X$. Further, the PAM optical signal 108 may be generated with PAM-N using X modulator segments, where $X=\log_2(N)$ and N is the PAM number. For example, the OMD 102 as illustrated has 2 modulator segments, whereby $X=2$ and PAM-4 may be achieved.

With continued reference to FIG. 1, the plurality of modulator segments 104 comprise individual inner contact regions 122 and individual outer contact regions 124. The inner contact regions 122 are along an inner sidewall of the ring-shaped waveguide 110 and are surrounded by the ring-shaped waveguide 110. The outer contact regions 124 are along an outer sidewall of the ring-shaped waveguide 110, outside the area surrounded by the ring-shaped waveguide 110. The inner contact regions 122 and the outer contact region regions 124 provide contact points for electrically coupling the driver-signal lines 120 to the plurality of modulator segments 104.

In some embodiments, the plurality of modulator segments 104 are PN-junction diodes in which the PN junctions are in the ring-shaped waveguide 110. In such embodiments, the inner contact regions 122 may be heavily doped P-type regions electrically coupled to anodes of the PN-junction diodes, and the outer contact regions 124 may be heavily doped N-type regions electrically coupled to cathodes of the PN-junction diodes. In alternative embodiments, the inner contact regions 122 may be heavily doped N-type regions electrically coupled to cathodes of the PN-junction diodes, whereas the outer contact regions 124 may be heavily doped P-type regions electrical coupled to anodes of the PN-junction diodes.

In some embodiments, the ring-shaped waveguide 110 and the input-output waveguide 112 are semiconductive. For example, the ring-shaped waveguide 110 and the input-output waveguide 112 may correspond to portions of a silicon layer or the like. In such embodiments, the input-output waveguide 112 is undoped or otherwise lightly doped. Further, the ring-shaped waveguide 110 is undoped or otherwise lightly doped outside the plurality of modulator segments 104 and is doped at the plurality of modulator segments 104. For example, the ring-shaped waveguide 110 may be doped to form PN junctions of the plurality of modulator segments 104. The light doping may, for example, be a doping concentration less than a doping concentration of the PN junctions and/or may, for example, be a doping concentration less than about 5e16 atoms/cm³ or some other suitable value.

In some embodiments, the driver 118 is implemented by CMOS transistors and/or devices. In some embodiments, the driver 118 may also be referred to as a driver circuit, a CMOS driver, a CMOS driver circuit, or the like.

In some embodiments, the plurality of modulator segments 104 may also be referred to as modulators for short, junction modulators, junction modulator segments, diode modulators, diode modulator segments, or the like. In some embodiments, the ring-shaped waveguide 110 may also be referred to as a ring waveguide bus, a ring bus, or the like, and/or the input-output waveguide 112 may also be known as a input-output waveguide bus, a linear bus, or the like. In some embodiments, the ring-shaped waveguide 110 and the input-output waveguide 112 form and/or may be collectively referred to as an optical ring resonator or the like.

In some embodiments, the OMD 102 is a Mach-Zehnder modulator, a micro-ring modulator, a ring resonator, or the like. In some embodiments, the OMD 102 may also be referred to as an optical modulator or the like. In some embodiments, the OMD 102 may modulate the PAM optical signal 108 with a bit rate of 100 or more gigabits per second (Gbps). For example, a bit rate of 150 Gbps, 200 Gbps, or more may be achieved.

While the OMD 102 is illustrated with only two modulator segments, the OMD 102 may have one or more additional modulator segments in alternative embodiments. The one or more additional modulator segments allow higher PAM levels to be achieved. As noted above, the PAM level is related to the total number of modulator segments by $N=2^X$, where N is the PAM level and X is the number of modulator segments.

Figure 2:
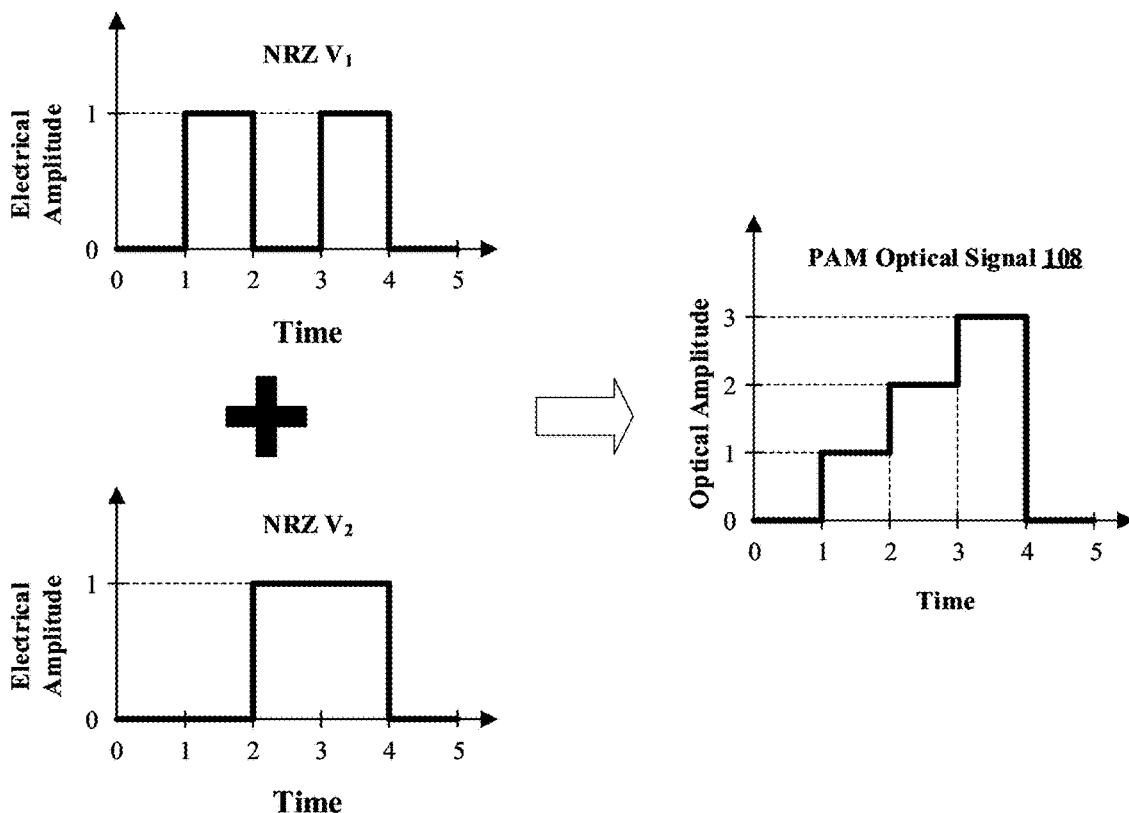
FIG. 2 illustrates some embodiments of signal-timing diagrams for generation of a PAM optical signal using the two modulator segments of FIG. 1.

With reference to FIG. 2, some embodiments of signal-timing diagrams are provided for generation of the PAM optical signal 108 of FIG. 1 with PAM-4 using the first and second modulator segments 104a, 104b of FIG. 1.

The first NRZ electrical signal $V_1$ and the second NRZ electrical signal $V_2$ have only two amplitudes, which are labeled 0 and 1. An amplitude of 0 corresponds to an OFF state of a corresponding modulator segment, whereas an amplitude of 1 corresponds to an ON state of a corresponding modulator segment. The PAM optical signal 108 has four amplitudes, which are labeled 0, 1, 2, and 3. Through coordination between the first and second NRZ electrical signals $V_1$, $V_2$, light may be modulated into the PAM optical signal 108.

During the time period spanning from time 0 to time 1, or during the time period spanning from time 4 to time 5, the first and second NRZ electrical signals $V_1$, $V_2$ both have amplitudes of 0. As a result, the first and second modulator segments 104a, 104b are both OFF and the PAM optical signal 108 has an amplitude of 0.

During the time period spanning from time 1 to time 2, the first NRZ electrical signal $V_1$ has an amplitude of 1 and the second NRZ electrical signal $V_2$ has an amplitude of 0. As a result, the first modulator segment 104a is ON, whereas the second modulator segment is OFF. Further, the PAM optical signal 108 has an amplitude of 1.

During the time period spanning from time 2 to time 3, the first NRZ electrical signal $V_1$ has an amplitude of 0 and the second NRZ electrical signal $V_2$ has an amplitude of 1. As a result, the first modulator segment 104a is OFF, whereas the second modulator segment is ON. Further, the PAM optical signal 108 has an amplitude of 2. The second modulator segment 104b has a power factor that is twice that of the first modulator segment 104a and hence increases an amplitude of the PAM optical signal 108 by twice that of the first modulator segment 104a.

During the time period spanning from time 3 to time 4, the first and second NRZ electrical signals $V_1$, $V_2$ both have amplitudes of 1. As a result, the first and second modulator segments 104a, 104b are both ON and the PAM optical signal 108 has an amplitude of 3. The increases in amplitude from the first and second modulator segments 104a, 104b are additive and have a 1:2 ratio, thereby resulting in the amplitude of 3.

As seen through the various time periods above, coordination between the first and second NRZ electrical signals $V_1$, $V_2$ can vary the PAM optical signal 108 between the four amplitudes. Hence, PAM-4 can be achieved. Further, by adding additional modulator segments and additional NRZ electrical signals, higher PAM levels may be achieved.

Figure 3A:
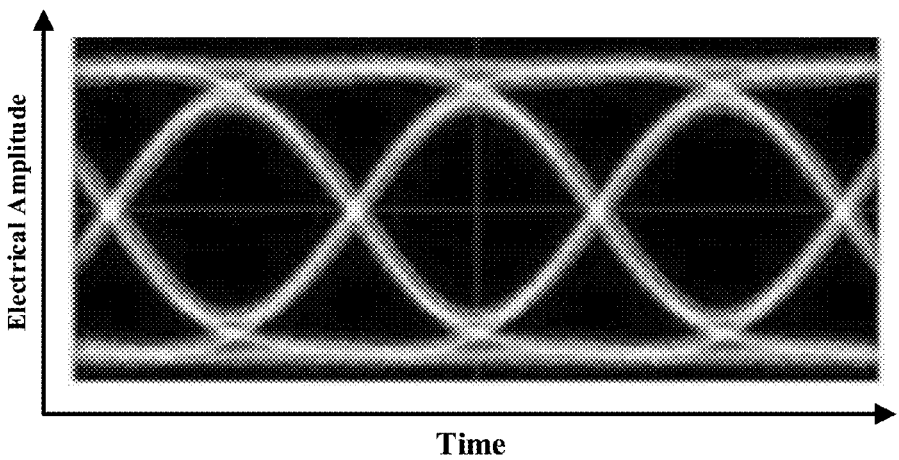
FIGS. 3A and 3B illustrate some embodiments of eye diagrams respectively for an NRZ electrical signal of FIG. 1 and a PAM optical signal of FIG. 1.
Figure 3B:
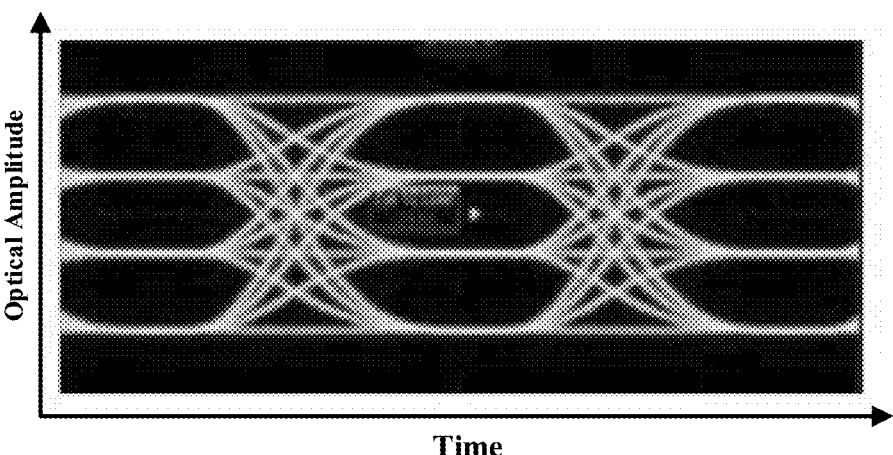

With reference to FIGS. 3A and 3B, some embodiments of eye diagrams respectively for an NRZ electrical signal of FIG. 1 and the PAM optical signal 108 of FIG. 1 are provided. The vertical axis corresponds to amplitude, and the horizontal axis corresponds to time. Electrical amplitude may, for example, be in terms of voltage or the like. FIG. 3A corresponds to an NRZ electrical signal of FIG. 1, such as the first NRZ electrical signal $V_1$ of FIG. 1 or the second NRZ electrical signal $V_2$ of FIG. 1. Further, as seen in the eye diagram of FIG. 3A, the NRZ electrical signal has only two amplitudes. FIG. 3B corresponds to the PAM optical signal 108 of FIG. 1, which is modulated using PAM-4. Further, as seen in the eye diagram of FIG. 3B, the PAM optical signal 108 of FIG. 1 has only 4 states.

Figure 4:
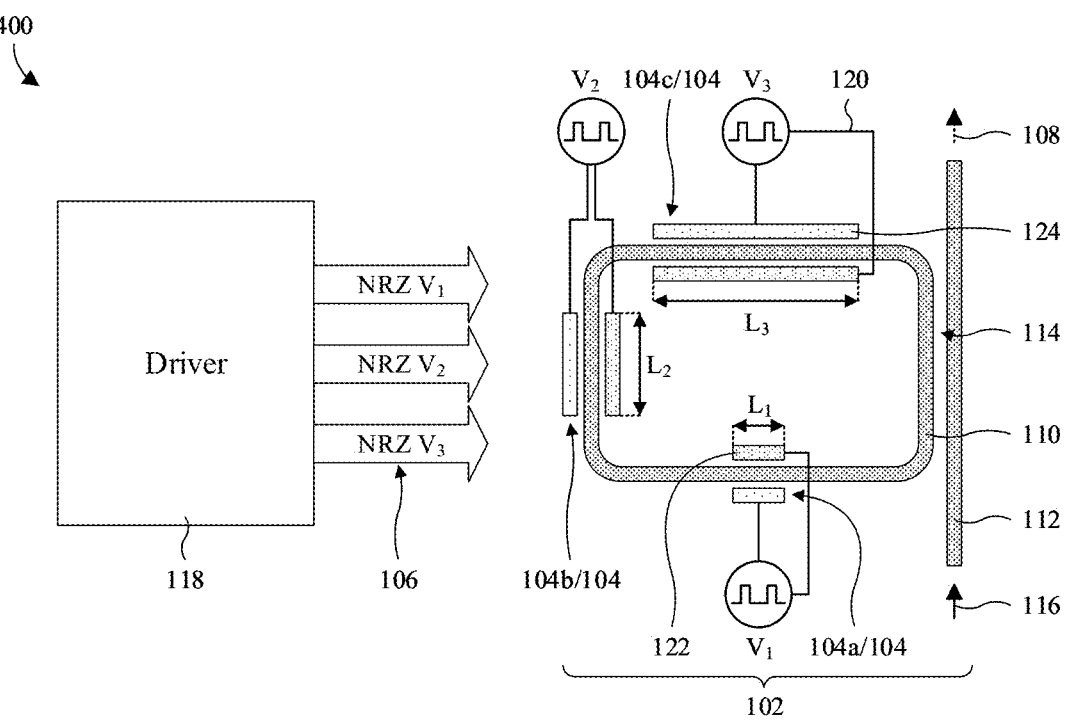
FIG. 4 illustrates a schematic view of some alternative embodiments of the optical module of FIG. 1 in which the OMD has three modulator segments.

With reference to FIG. 4, a schematic view 400 of some alternative embodiments of the optical module of FIG. 1 is provided in which the plurality of modulator segments 104 further comprises a third modulator segment 104c. The third modulator segment 104c is arranged along the ring-shaped waveguide 110, spaced from the first and second modulator segments 104a, 104b. Further, the third modulator segment 104c is electrically coupled to the driver 118 and driven by a third NRZ electrical signal $V_3$ generated by the driver 118.

Because the plurality of modulator segments 104 each have two states, and are driven by separate NRZ electrical signals 106, the OMD 102 has $2^X$ different modulation states, where X is a total number of modulator segments. For example, the OMD 102 has X=3 modulator segments as illustrated and hence has 8 modulation states. These 8 modulation states are 000, 001, 010, 011, 100, 101, 110, and 111. The plurality of modulator segments 104 are represented by a single digit in each of these modulator-state numbers, where the first, second, and third modulator segments 104a, 104b, 104c correspond to the least significant digit (rightmost digit) to the most significant digital (leftmost digit). Further, 1 corresponds to an ON state of a modulator segment, and 0 correspond to an OFF state of a modulator.

Each of the plurality of modulator segments 104 has a different length than each other modulator segment. Further, each of the plurality of modulator segments 104, except a shortest modulator segment, has a length along the ring-shaped waveguide 110 that is twice a length of another one of the plurality of modulator segments 104. Hence, the third modulator segment 104c has a length $L_3$ that is twice a length $L_2$ of the second modulator segment 104b, which is twice a length $L_1$ of the first modulator segment 104a. Because of the two-to-one length ratios, each of the plurality of modulator segments 104 has a different power factor than each other modulator segment. Further, because of the two-to-one length ratios, the third modulator segment 104c has a power factor that is twice a power factor of the second modulator segment 104b, which is twice a power factor of the first modulator segment 104a.

Because amplitude modulation by the plurality of modulator segments 104 is additive, and because the plurality of modulator segments 104 have different power factors, the $2^X$ different modulation states correspond to $2^X$ different amplitudes. Hence, the plurality of modulator segments 104 may be driven so as to generate the PAM optical signal 108 with PAM-N, where $N=2^X$ and X is a total number of modulator segments. For example, the OMD 102 as illustrated has X=3 modulator segments, whereby PAM-8 may be achieved.

Figure 5A:
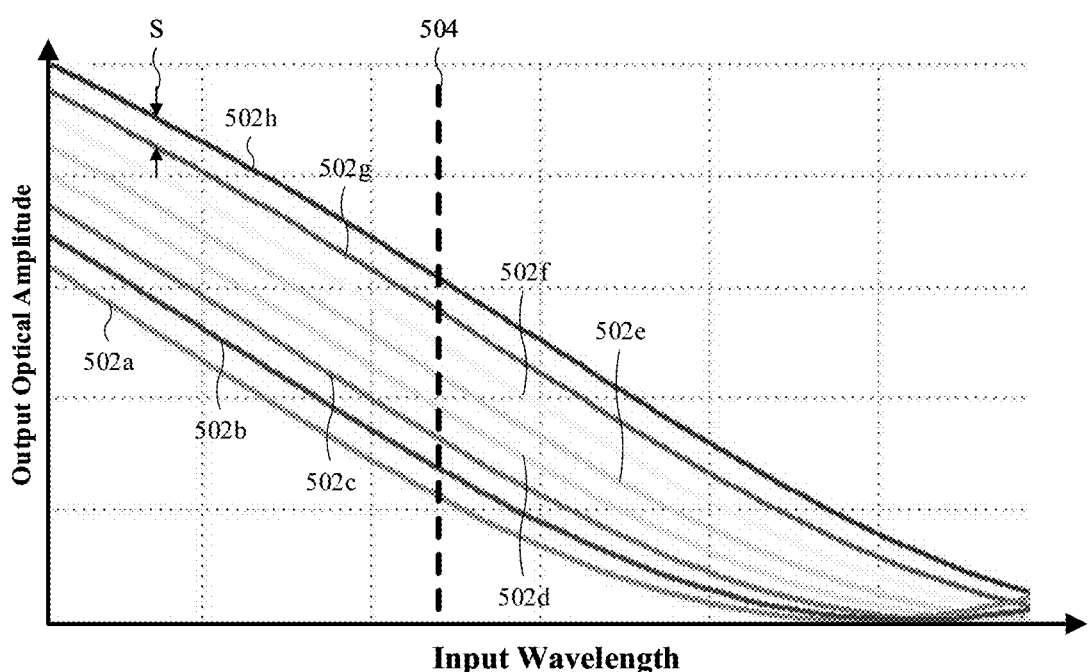
FIG. 5A illustrates a graph of optical output amplitude as a function of optical input wavelength and modulation level for some embodiments of the OMD of FIG. 4.

With reference to FIG. 5A, a graph of optical output amplitude as a function of optical input wavelength and modulation level for some embodiments of the OMD 102 of FIG. 4 is provided. Optical output amplitude is illustrated by the vertical axis and corresponds to an amplitude of the PAM optical signal 108 of FIG. 4. Optical input wavelength is illustrated by the horizontal axis and corresponds to a wavelength of the light 116 of FIG. 4. Modulation level is illustrated by lines 502a-502h and corresponds to the eight modulation levels of PAM-8.

As seen, uniformity of the spacing S between the lines 502a-502h varies depending upon the optical input wavelength of the light 116 input into the OMD 102 of FIG. 4. Hence, linearity of the OMD 102 varies depending on the optical input wavelength.

Ideally, the spacing S is uniform between the lines 502a-502h and hence optical output amplitudes of the eight modulation levels are evenly spaced. This enhances linearity of the OMD 102 and makes decoding the PAM optical signal 108 of FIG. 4 less prone to error. Therefore, the optical input wavelength is chosen so the spacing S between the lines 502a-502h is uniform. For example, the optical input wavelength may be chosen as wavelength 504. Further, it has been appreciated that decreasing the optical input wavelength generally increases the uniformity of the spacing S and hence increases the linearity of the OMD 102.

Figure 5B:
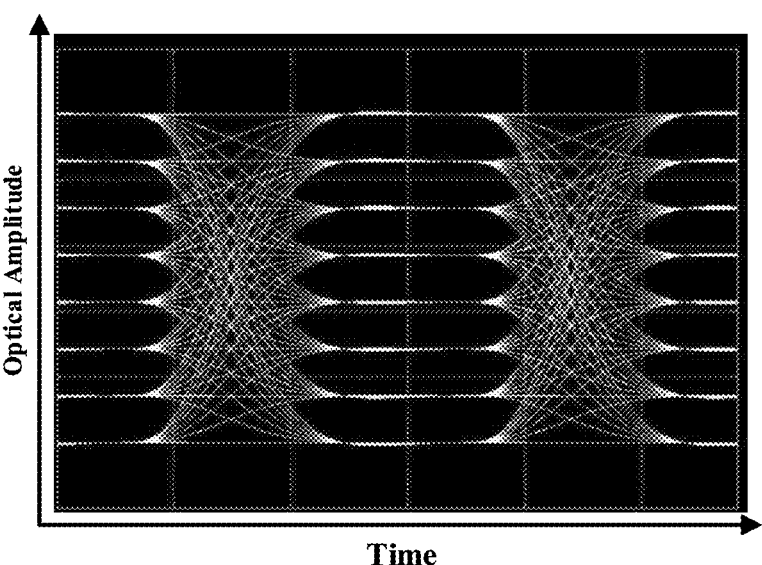
FIG. 5B illustrates some embodiments of an eye diagram for a PAM optical signal of FIG. 4.

With reference to FIG. 5B, some embodiments of an eye diagram for the PAM optical signal 108 of FIG. 4 is provided. The vertical axis corresponds to amplitude, and the horizontal axis corresponds to time. The PAM optical signal 108 is modulated using PAM-8, whereby 8 amplitude states are seen in the eye diagram. As described with regard to FIG. 5A, the optical input wavelength is chosen to improve uniformity in spacing between the 8 amplitude states. The improves the uniformity in amongst eyes of the eye diagram.

Figure 6A:
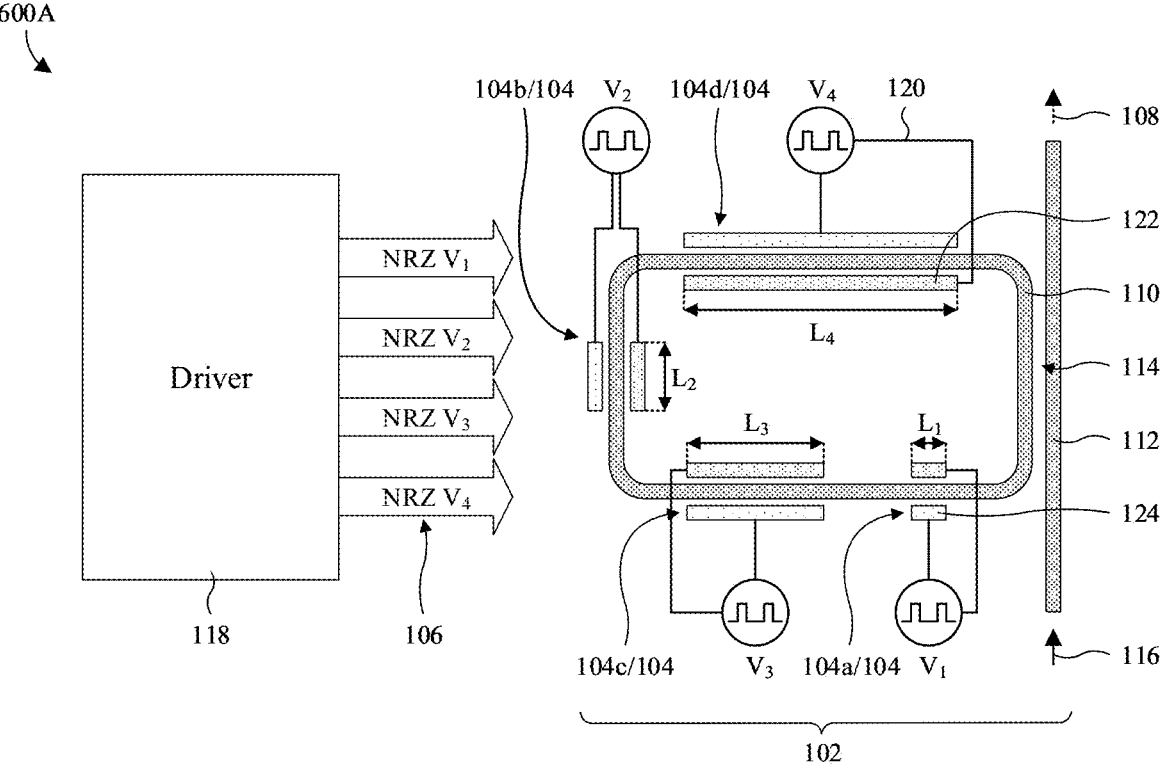
FIGS. 6A and 6B illustrate schematic views of some alternative embodiments of the optical modulator of FIG. 4 in which the OMD has four modulator segments.
Figure 6B:
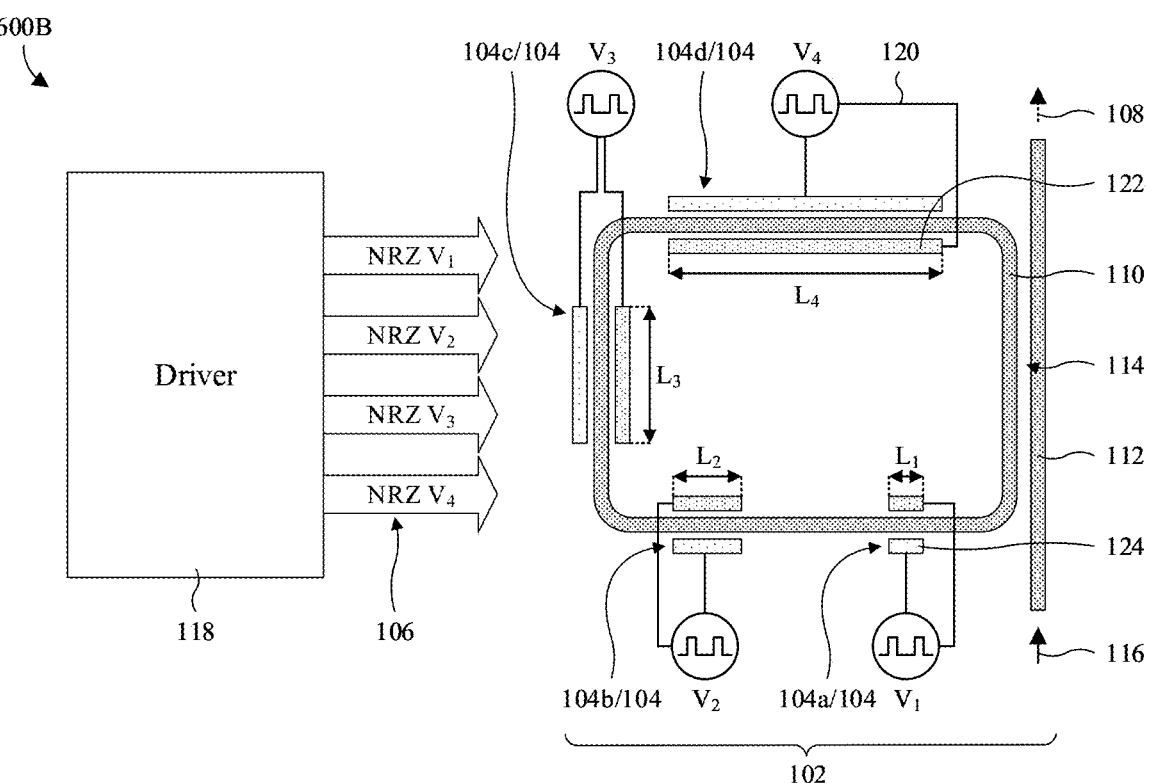

With reference to FIGS. 6A and 6B, schematic views 600A, 600B of some alternative embodiments of the optical modulator of FIG. 4 are provided in which the plurality of modulator segments 104 further comprises a fourth modulator segment 104d. The fourth modulator segment 104d is arranged along the ring-shaped waveguide 110, spaced from the first, second, and third modulator segments 104a, 104b, 104c. Further, the fourth modulator segment 104d is electrically coupled to the driver 118 and driven by a fourth NRZ electrical signal $V_4$ generated by the driver 118. In FIG. 6A, the second modulator segment 104b is between the fourth modulator segment 104d and the third modulator segment 104c along the ring-shaped waveguide 110. In FIG. 6B, the third modulator segment 104c is between the fourth modulator segment 104d and the second modulator segment 104b along the ring-shaped waveguide 110.

Because the plurality of modulator segments 104 each have two states, and are driven by separate NRZ electrical signals 106, the OMD 102 has $2^X$ different modulation states, where X is a total number of modulator segments. For example, the OMD 102 has X=4 modulator segments as illustrated and hence has 16 modulation states. These 16 modulation states are 0000, 0001, 0010, 0011, 0100, 0101, 0110, 0111, 1000, 1001, 1010, 1011, 1100, 1101, 1110, 1111. The plurality of modulator segments 104 are represented by a single digit in each of these modulator-state numbers, where the first, second, third, and fourth modulator segments 104a, 104b, 104c, 104d correspond to the least significant digit (rightmost digit) to the most significant digital (leftmost digit). Further, 1 corresponds to an ON state of a modulator segment, and 0 correspond to an OFF state of a modulator.

Each of the plurality of modulator segments 104 has a different length than each other modulator segment. Further, each of the plurality of modulator segments 104, except a shortest modulator segment, has a length along the ring-shaped waveguide 110 that is twice a length of another one of the plurality of modulator segments 104. Hence, the fourth modulator segment 104d has a length $L_4$ that is twice a length $L_3$ of the third modulator segment 104c, which is twice a length $L_2$ of the second modulator segment 104b, which is twice a length $L_1$ of the first modulator segment 104a. Because of the two-to-one length ratios, each of the plurality of modulator segments 104 has a different power factor than each other modulator segment. Further, because of the two-to-one length ratios, the fourth modulator segment 104d has a power factor that is twice a power factor of the third modulator segment 104c, which is twice a power factor of the second modulator segment 104b, which is twice a power factor of the first modulator segment 104a.

Because amplitude modulation by the plurality of modulator segments 104 is additive, and because the plurality of modulator segments 104 have different power factors, the $2^X$ different modulation states correspond to $2^X$ different amplitudes. Hence, the plurality of modulator segments 104 may be driven so as to modulate the PAM optical signal 108 with PAM-N, where $N=2^X$ and X is a total number of modulator segments. For example, the OMD 102 as illustrated has X=4 modulator segments, whereby PAM-16 may be achieved.

Figure 7:
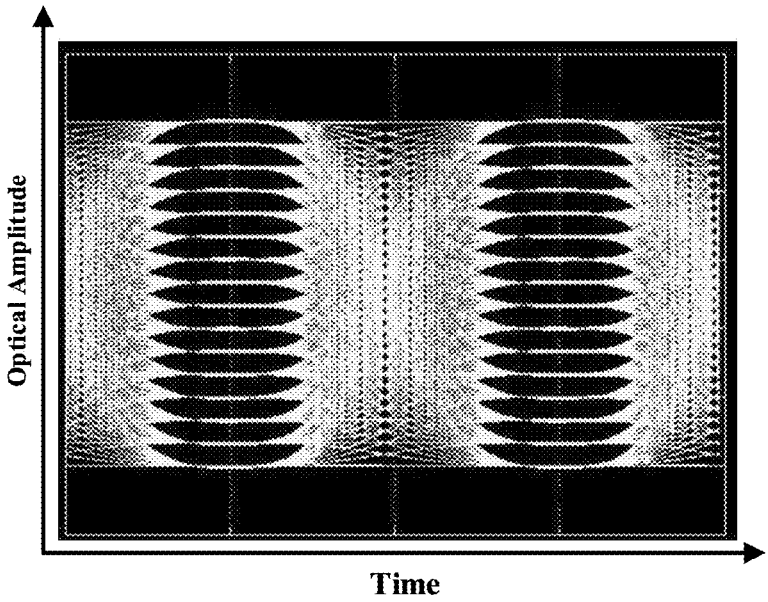
FIG. 7 illustrates some embodiments of an eye diagram for a PAM optical signal of FIGS. 6A and 6B.

With reference to FIG. 7, some embodiments of an eye diagram for the PAM optical signal 108 of FIGS. 6A and 6B is provided. The vertical axis corresponds to amplitude, and the horizontal axis corresponds to time. The PAM optical signal 108 is modulated using PAM-16, whereby 16 amplitude states are seen in the eye diagram.

Figure 8A:
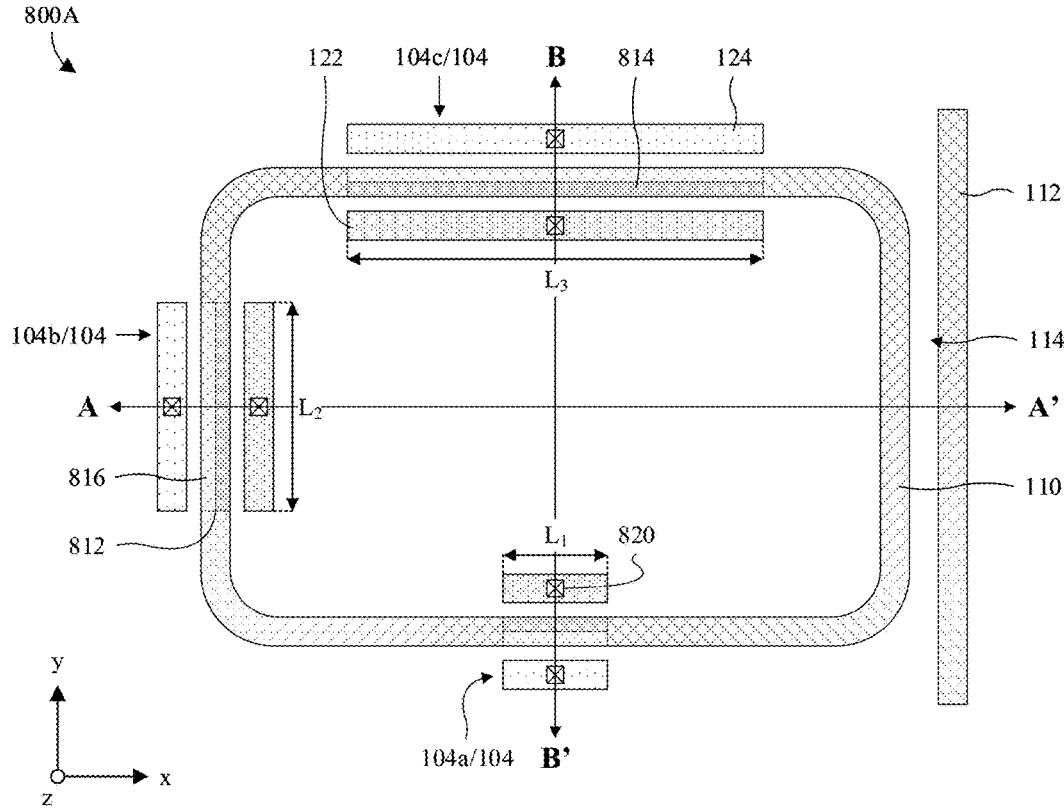
FIGS. 8A-8C illustrate various views of some embodiments of the OMD of FIG. 4 in which additional detail is illustrated.
Figure 8B:
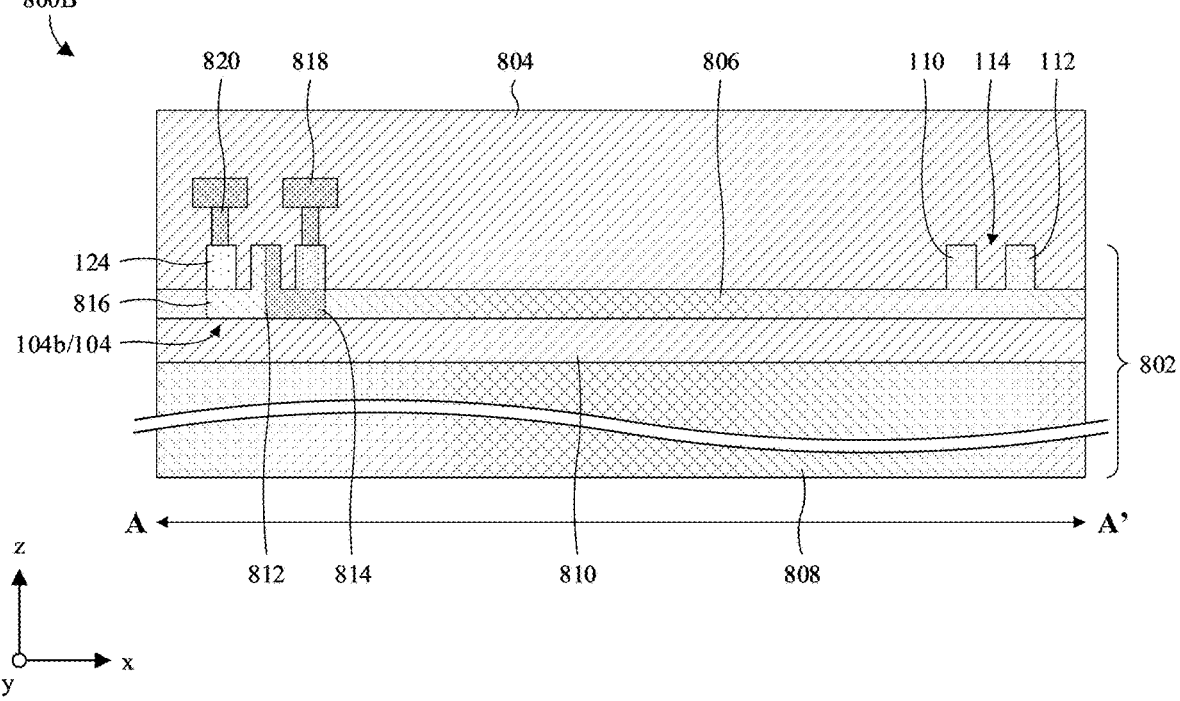
Figure 8C:
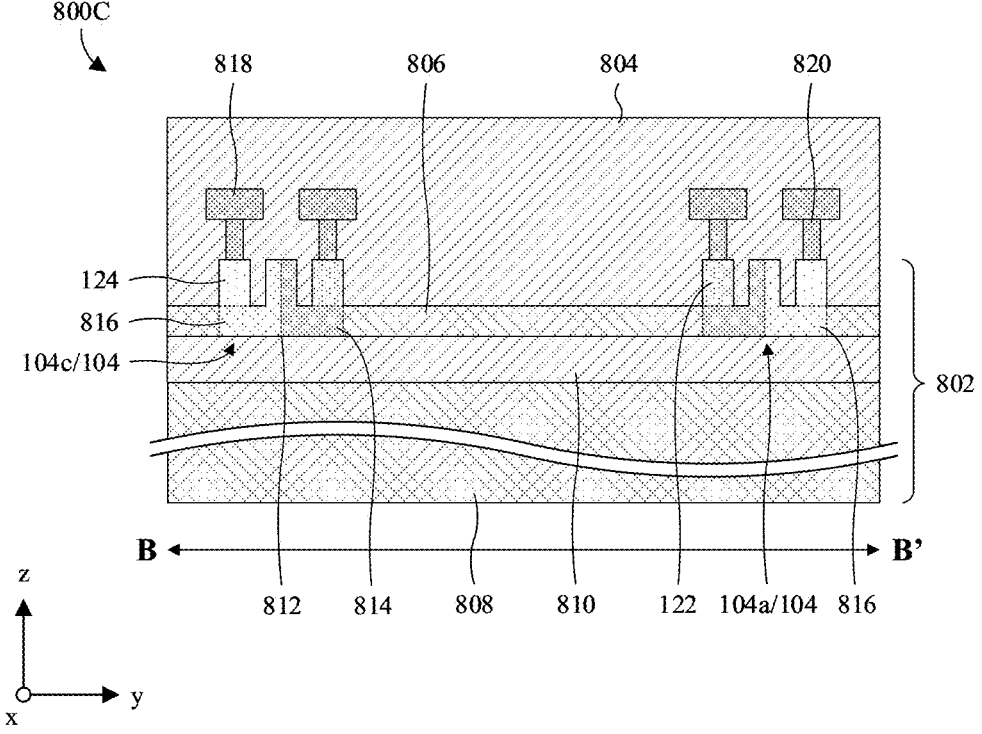

With reference to FIG. 8A-8C, various views 800A-800C of some embodiments of the OMD 102 of FIG. 4 are provided in which additional detail is illustrated. FIG. 8A corresponds to a top layout view 800A, whereas FIGS. 8B and 8C correspond to cross-sectional views 800B, 800C respectively along line A-A' and line B-B' in FIG. 8A.

Focusing on FIGS. 8B and 8C, the ring-shaped waveguide 110, the input-output waveguide 112, and the plurality of modulator segments 104 are on a semiconductor-on-insulator (SOI) substrate 802 and are covered by a dielectric layer 804. Further, the ring-shaped waveguide 110, the input-output waveguide 112, and the plurality of modulator segments 104 are formed in a semiconductor layer 806 of the SOI substrate 802. The semiconductor layer 806 overlies a semiconductor substrate 808 of the SOI substrate 802 and is spaced from the semiconductor substrate 808 by an insulator layer 810 of the SOI substrate 802.

The semiconductor layer 806 may, for example, be or comprise monocrystalline silicon and/or some other suitable semiconductor material. Similarly, the semiconductor substrate 808 may, for example, be or comprise monocrystalline silicon and/or some other suitable semiconductor material. The insulator layer 810 may, for example, be or comprise silicon oxide and/or some other suitable dielectric material. The dielectric layer 804 may, for example, be or comprise silicon oxide and/or some other suitable dielectric material.

The ring-shaped waveguide 110 corresponds to a ring-shaped protrusion of the semiconductor layer 806 that extends in a closed path (see, e.g., FIG. 8A). Similarly, the input-output waveguide 112 corresponds to line-shaped protrusion of the semiconductor layer 806 that borders the ring-shaped protrusion at the coupling area 114. Note that while FIG. 8A illustrates the ring-shaped waveguide 110 with a square ring-shaped top layout, other suitable top layouts are amenable. Similarly, while FIG. 8A illustrates the input-output waveguide 112 with a line-shaped top layout, other suitable top layouts are amenable.

Focusing on FIGS. 8A-8C, the ring-shaped waveguide 110 is undoped or otherwise lightly doped outside the plurality of modulator segments 104. Similarly, the input-output waveguide 112 is undoped or otherwise lightly doped. The light doping may, for example, be a doping concentration less than a minimum doping concentration of the plurality of modulator segments 104 and/or may, for example, be a doping concentration less than about 5e16 atoms/cm³ or some other suitable value.

The plurality of modulator segments 104 comprise individual PN junctions 812 in the ring-shaped waveguide 110. As such, the plurality of modulator segments 104 may be regarded as PN junction diodes or the like. By modulating the voltage across the PN junctions 812 (e.g., with the NRZ electrical signals 106 of FIG. 4), a resonant wavelength of the ring-shaped waveguide 110 may be shifted and an amplitude of the PAM optical signal 108 may be shifted. The PN junctions 812 may be reverse biased or forward biased.

The PN junctions 812 are formed by individual first-doping-type regions 814 and individual second-doping-type regions 816. The first-doping-type regions 814 and the second-doping-type regions 816 are in the semiconductor layer 806 and have opposite doping types. For example, the first-doping-type regions 814 may be P-type, whereas the second-doping-type regions 816 may be N-type, or vice versa.

The first-doping-type regions 814 extend continuously respectively from the PN junctions 812 respectively to the inner contact regions 122. Further, the first-doping-type regions 814 share a doping type with the inner contact regions 122, but have a lesser doping concentration than the inner contact regions 122. Hence, the inner contact regions 122 provide contact points for anodes or cathodes of the plurality of modulator segments 104. For example, when P-type, the inner contact regions 122 may provide anode contact points.

The second-doping-type regions 816 extend continuously respectively from the PN junctions 812 respectively to the outer contact regions 124. Further, the second-doping-type regions 816 share a doping type with the outer contact regions 124 but have a lesser doping concentration. Hence, the outer contact regions 124 provide contact points for cathodes or anodes of the plurality of modulator segments 104. For example, when N-type, the inner contact regions 122 may provide cathode contact points.

In some embodiments, the first-doping-type regions 814 and the second-doping-type regions 816 have higher doping concentrations along a bottom surface of the semiconductor layer 806 than at the ring-shaped waveguide 110. Further, these higher doping concentrations are less than doping concentrations of the inner and outer contact regions 122, 124.

A plurality of wires 818 and a plurality of vias 820 are in the dielectric layer 804. The plurality of wires 818 and the plurality of vias 820 are respectively grouped into wire levels and via levels that are alternatingly stacked to define conductive paths extending from the plurality of modulator segments 104. For example, a level of vias may extend from the inner and outer contact regions 122, 124 to a level of wires, and then additional levels of wires (not shown) and additional levels of vias (not shown) may be alternatingly stacked over the level of wires. The plurality of wires 818 and the plurality of vias 820 may, for example, be or comprise copper, aluminum, some other suitable metals, or any combination of the foregoing.

Figure 9A:
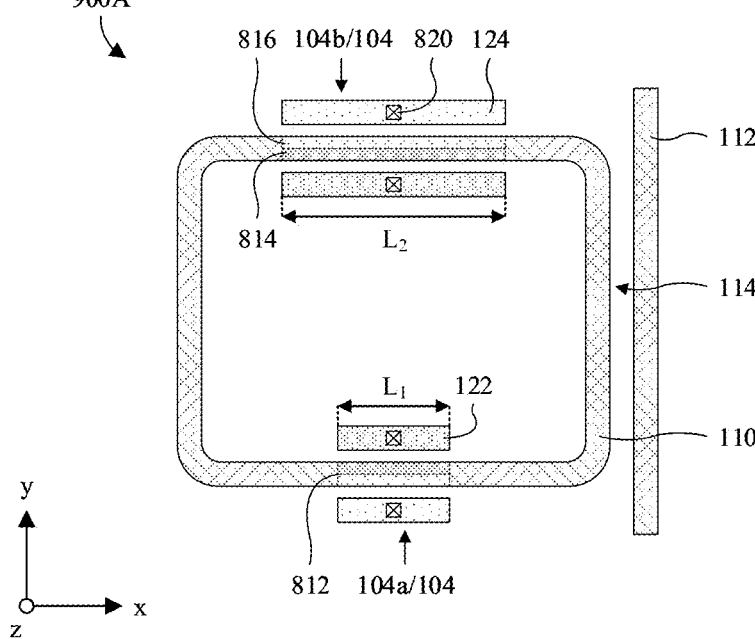
FIGS. 9A and 9B illustrate top layout views of some alternative embodiments of the OMD of FIG. 8A in which the OMD has different numbers of modulator segments.
Figure 9B:
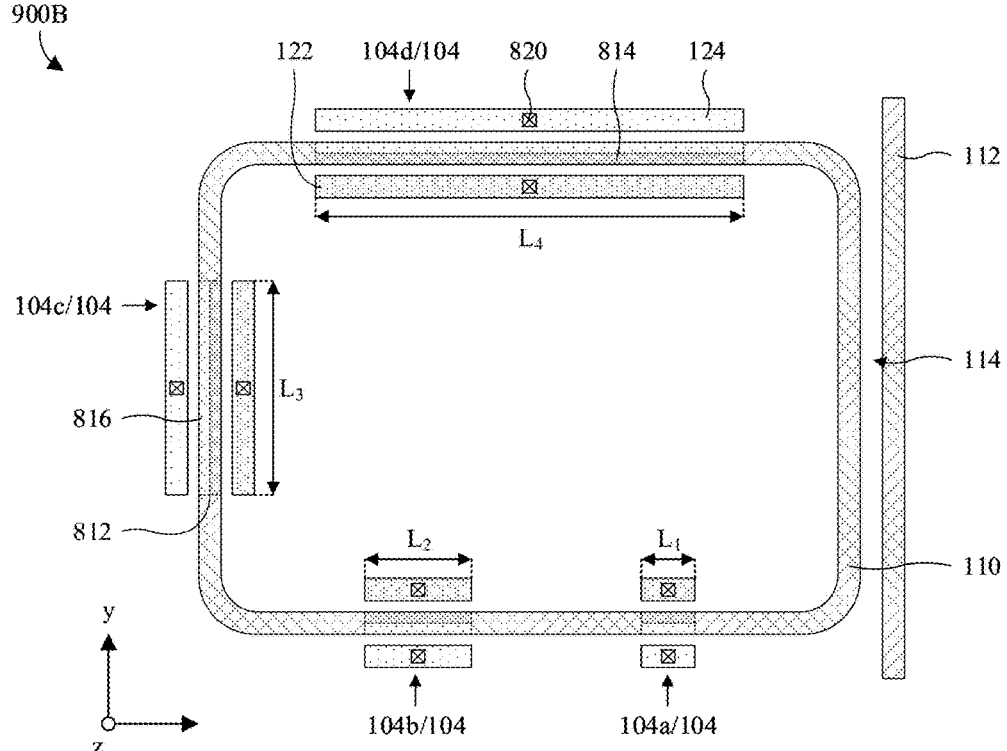

With reference to FIGS. 9A and 9B, top layout views 900A, 900B of some alternative embodiments of the OMD of FIG. 8A are provided in which the OMD has different numbers of modulator segments 104. In FIG. 9A, the OMD has two modulator segments 104, including the first modulator segment 104a and the second modulator segment 104b. As such, the OMD is configured for PAM-4. In contrast, the OMD of FIG. 8A is configured for PAM-8. In FIG. 9B, the OMD has four modulator segments 104, including the first modulator segment 104a, the second modulator segment 104b, the third modulator segment 104c, and the fourth modulator segment 104d. As such, the OMD is configured for PAM-16.

Figure 10A:
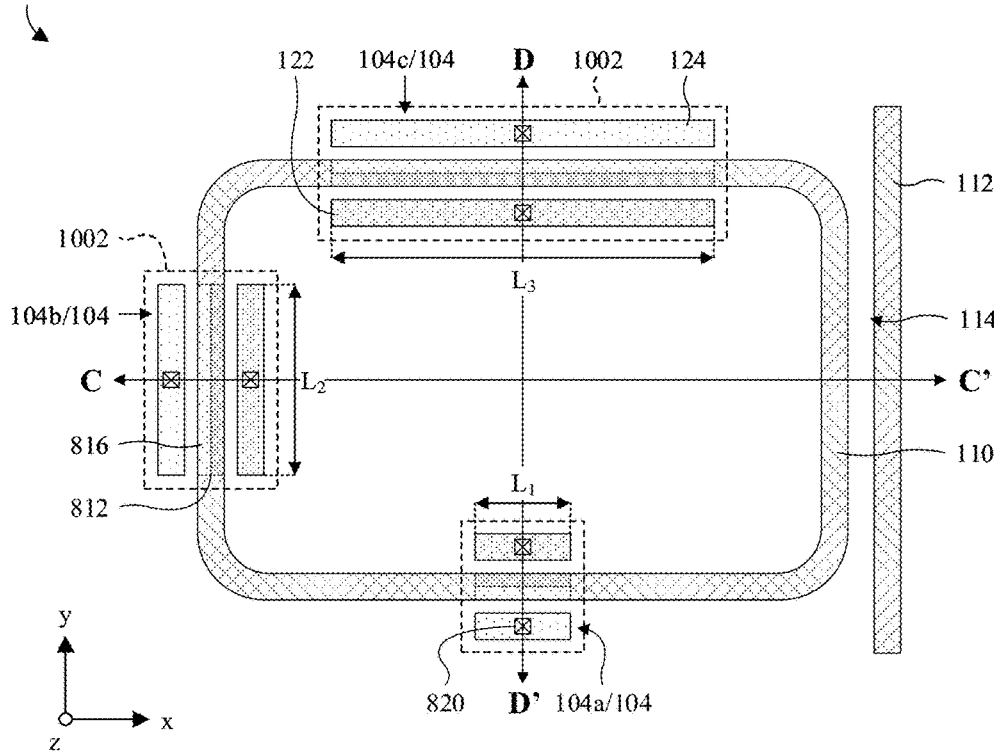
FIGS. 10A-10C illustrate various views of some alternative embodiments of the OMD of FIGS. 8A-8C in which heaters overlap with the modulator segments.
Figure 10B:
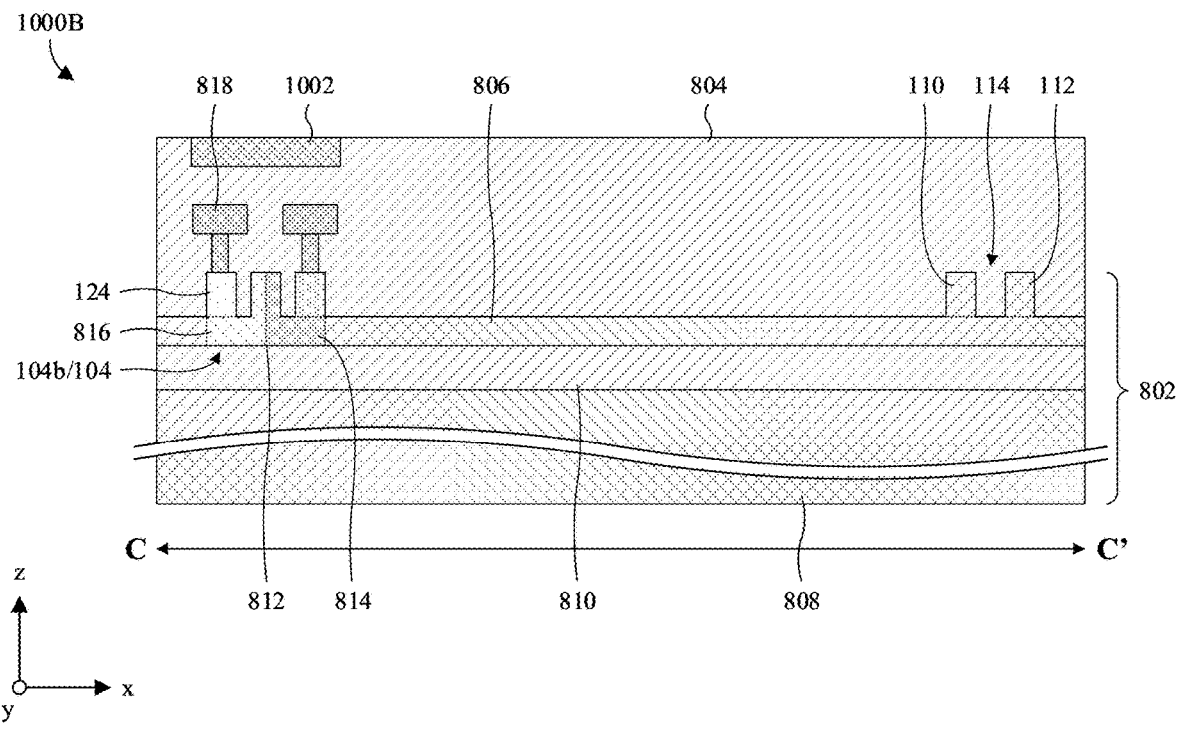
Figure 10C:
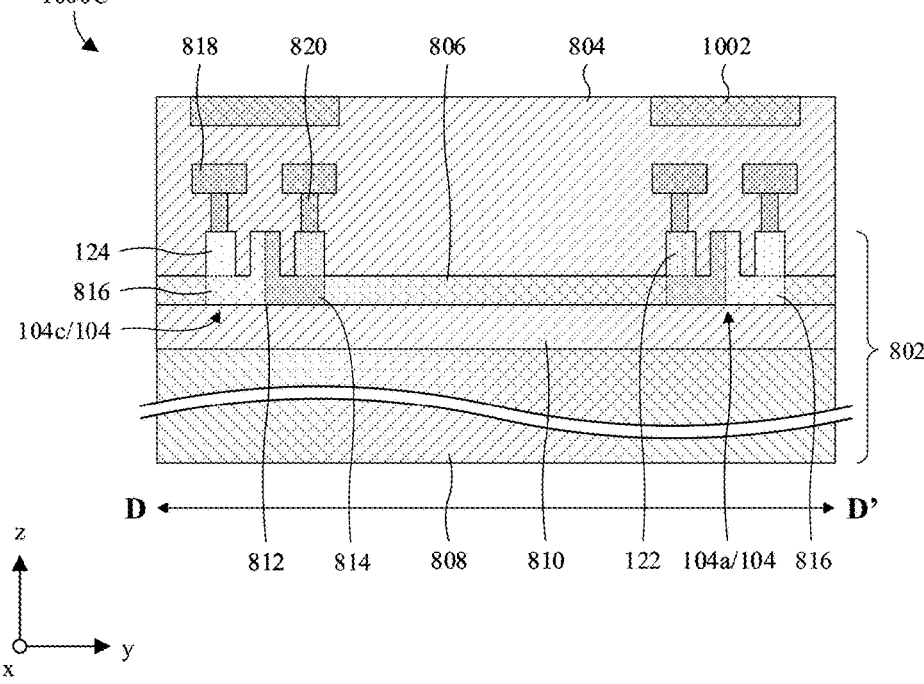

With reference to FIG. 10A-10C, various views 1000A-1000C of some alternative embodiments of the OMD of FIGS. 8A-8C are provided in which the OMD comprises heaters 1002 (shown in phantom in FIG. 10A). FIG. 10A corresponds to a top layout view 1000A, whereas FIGS. 10B and 10C correspond to cross-sectional views 1000B, 1000C respectively along line C-C' and line D-D' in FIG. 10A.

The heaters 1002 are individual to the plurality of modulator segments 104. Further, focusing on FIGS. 10B and 10C, the heaters 1002 respectively overlie the plurality of modulator segments 104 in the dielectric layer 804. The heaters 1002 may, for example, be resistive heaters and/or some other suitable type of heater. For example, to the extent that the heaters 1002 are resistive heaters, the heaters 1002 may be or comprise titanium nitride or the like. Titanium nitride has a high resistance that creates heat when a current is passed through it.

The OMD may suffer from resonant wavelength shift due to manufacturing process variations or real-time temperature variations. Hence, optical amplitude of the PAM optical signal (e.g., the PAM optical signal 108 of FIG. 4) generated by the OMD may vary with temperature and manufacturing variations. The heaters 1002 may selectively heat the ring-shaped waveguide 110 to compensate for the resonant wavelength shift. Further, by having multiple heaters, local variations may be compensated for.

While the heaters 1002 are illustrated as being elevated relative to a wire level (e.g., a level of the wires 818) closest to the SOI substrate 802, other suitable locations for the heaters 1002 are amenable. For example, the heaters 1002 may be level with the wire level. As another example, the heaters 1002 may be closer to the SOI substrate 802 than the wire level.

Figure 11A:
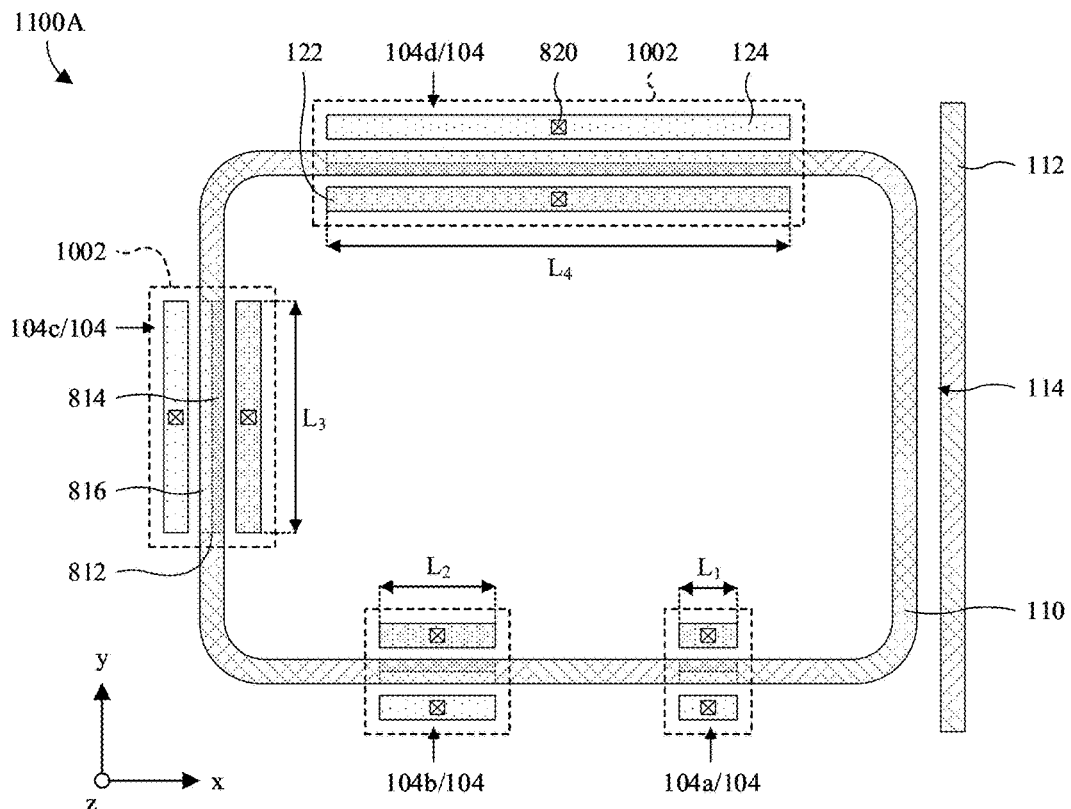
FIGS. 11A-11C illustrate top layout views of some alternative embodiments of the OMD of FIG. 10A.
Figure 11B:
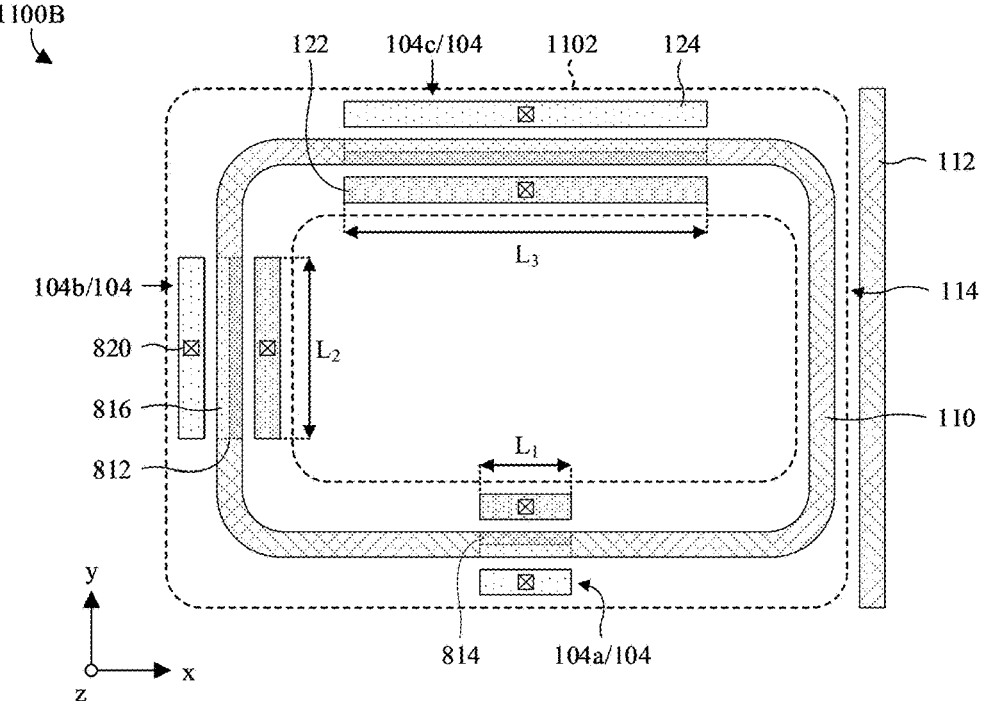
Figure 11C:
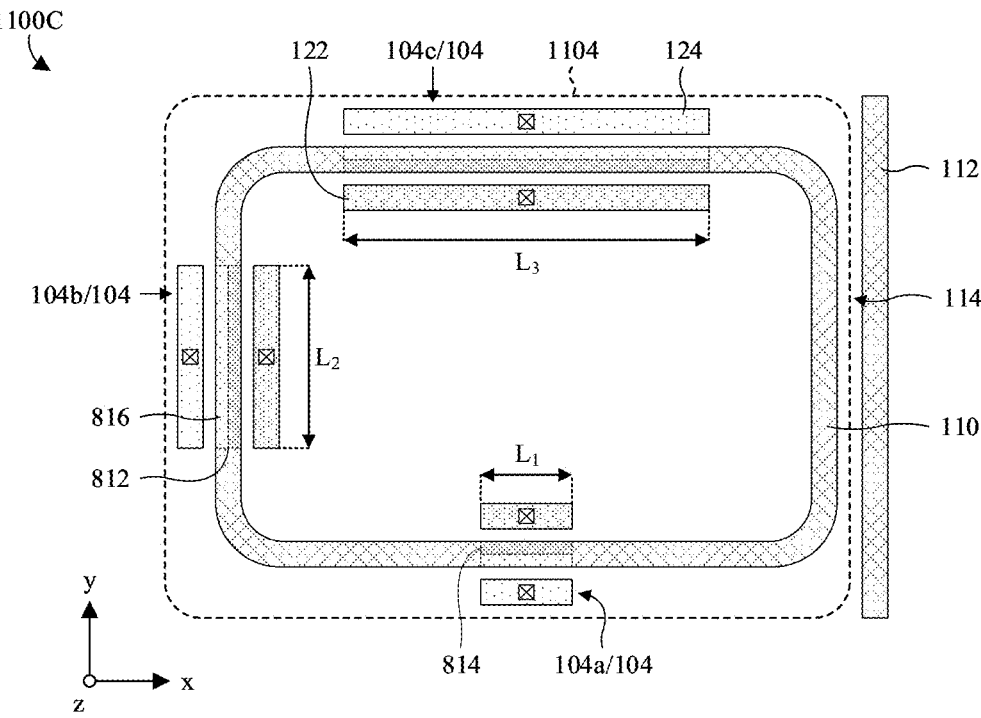

With reference to FIGS. 11A-11C, top layout views 1100A-1100C of some alternative embodiments of the OMD of FIG. 10A are provided. In FIG. 11A, the plurality of modulator segments 104 further comprise a fourth modulator segment 104d on the ring-shaped waveguide 110. Hence, the heaters 1002 comprise an additional heater individual to and respectively overlapping with the fourth modulator segment 104d. The additional heater may, for example, be as the other heaters are illustrated and described.

In FIG. 11B, the plurality of heaters 1002 are replaced with a single ring-shaped heater 1102 that overlaps with the plurality of modulator segments 104. Similarly, in FIG. 11C, the plurality of heaters 1002 are replaced with a single disc-shaped heater 1104 that overlaps with the plurality of modulator segments 104. The ring-shaped heater 1102 and the disc-shaped heater 1104 are as the heaters 1002 are described with regard to FIGS. 10A-10C. Hence, the ring-shaped heater 1102 and the disc-shaped heater 1104 may, for example, be resistive heaters or the like and/or may, for example, be or comprise titanium nitride or some other material.

Similar to the plurality of heaters 1002 of FIGS. 10A-10C, the ring-shaped heater 1102 and the disc-shaped heater 1104 allow selective compensation of resonant wavelength shift due to temperature variations and/or manufacturing variations. In contrast with the plurality of heaters 1002, the ring-shaped heater 1102 and the disc-shaped heater 1104 may be employed for global, rather than local, compensation of the resonant wavelength shift.

Figure 12A:
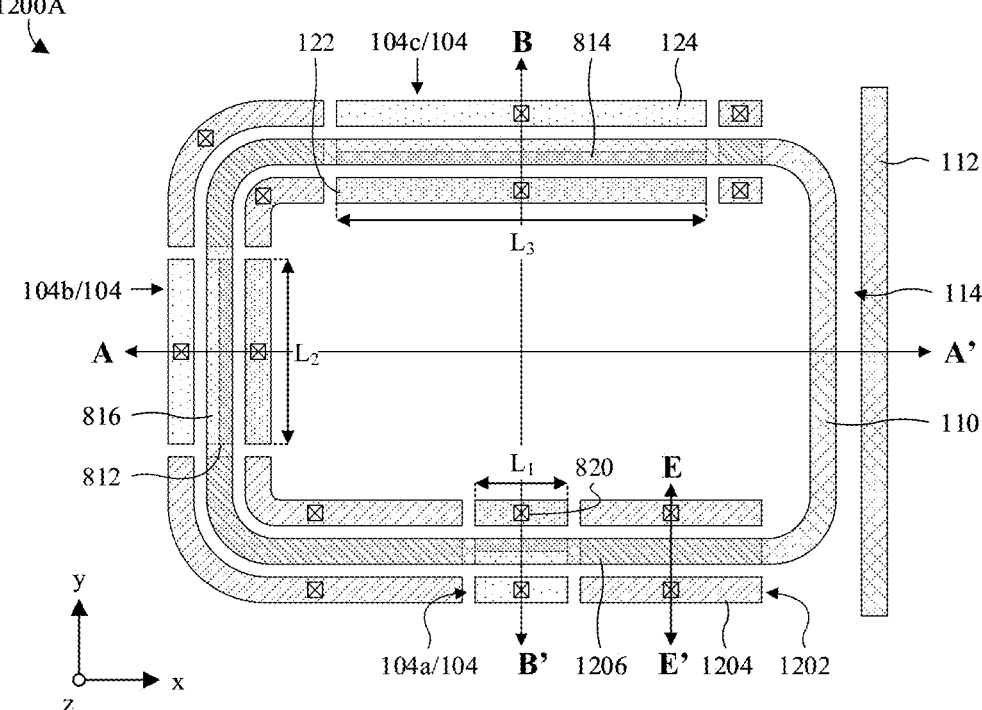
FIGS. 12A and 12B illustrate various views of some alternative embodiments of the OMD of FIGS. 8A-8C in which heaters are between the modulator segments.
Figure 12B:
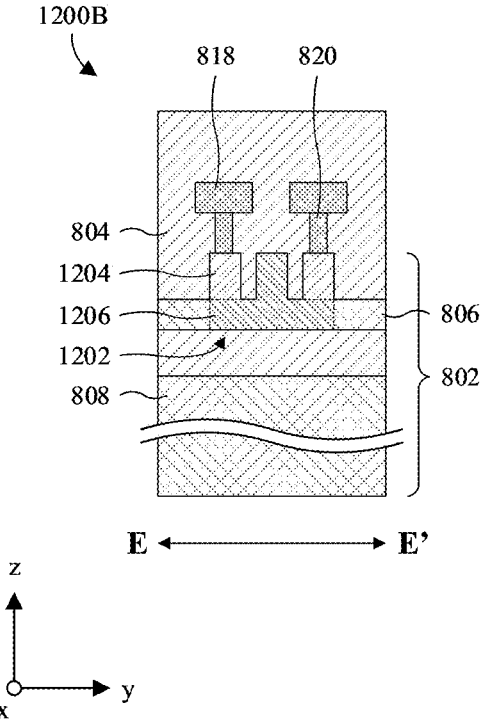

With reference to FIGS. 12A and 12B, various views 1200A, 1200B of some alternative embodiments of the OMD of FIGS. 8A-8C are provided in which heaters 1202 are between the plurality of modulator segments 104. FIG. 12A corresponds to a top layout view 1200A, whereas FIG. 12B corresponds to a cross-sectional view 1200B along line E-E' in FIG. 12A. In some embodiments, the cross-sectional views 800B, 800C of FIGS. 8B and 8C may, for example, be taken respectively along line A-A' and line B-B' in FIG. 12A.

The heaters 1202 separate the plurality of modulator segments 104 from each other and are spaced from the plurality of modulator segments 104 by undoped or lightly doped regions of the ring-shaped waveguide 110. The light doping may, for example, be a doping concentration less than a minimum doping concentration of the plurality of modulator segments 104 and/or a minimum doping concentration of the heaters 1202. Further, the light doping may, for example, be a doping concentration less than about 5e16 atoms/cm³ or some other suitable value.

Further, the heaters 1202 have a similar configuration as the plurality of modulator segments 104. The heaters 1202 comprise individual contact regions 1204, as well as individual resistive regions 1206 in the ring-shaped waveguide 110. However, in contrast with the plurality of modulator segments 104, the heaters 1202 lack PN junctions.

Each of the heaters 1202 comprises a pair of the contact regions 1204. Each contact-region pair comprises a contact region along an inner sidewall of the ring-shaped waveguide 110 and surrounded by the ring-shaped waveguide 110. Further, each contact-region pair comprises a contact region along an outer sidewall of the ring-shaped waveguide 110, outside the area surrounded by the ring-shaped waveguide 110. As best seen in FIG. 12B, the contact regions 1204 correspond to doped regions of the semiconductor layer 806.

The resistive regions 1206 are in the ring-shaped waveguide 110 and correspond to doped regions of the semiconductor layer 806. The resistive regions 1206 have a P-type doping or an N-type doping, which is shared with the contact regions 1204. Further, the resistive regions 1206 have a lesser doping concentration than the contact regions 1204. Each of the resistive regions 1206 is paired with two of the contact regions 1204. Further, each of the resistive regions 1206 is between and directly contacts (best seen in FIG. 12B) the corresponding contact regions.

Figure 13A:
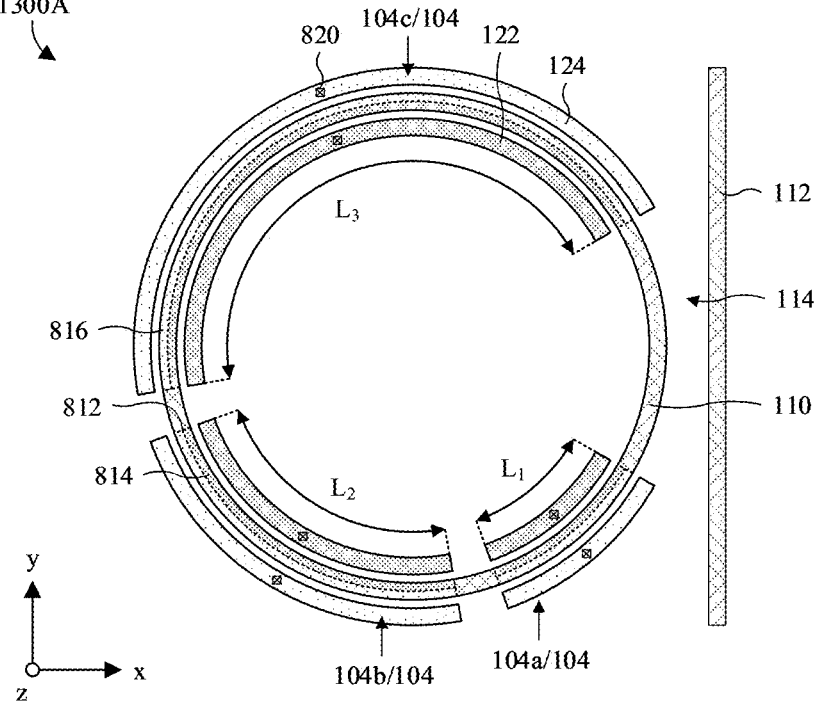
FIGS. 13A and 13B illustrate various top layout views of some alternative embodiments of the OMD of FIG. 8A in which a ring-shaped waveguide is circular ring-shaped.

With reference to FIG. 13A, a top layout view 1300A of some alternative embodiments of the OMD of FIG. 8A is provided in which the ring-shaped waveguide 110 is circular ring-shaped instead of square ring-shaped. In alternative embodiments, the ring-shaped waveguide 110 may have some other suitable top layout.

Figure 13B:
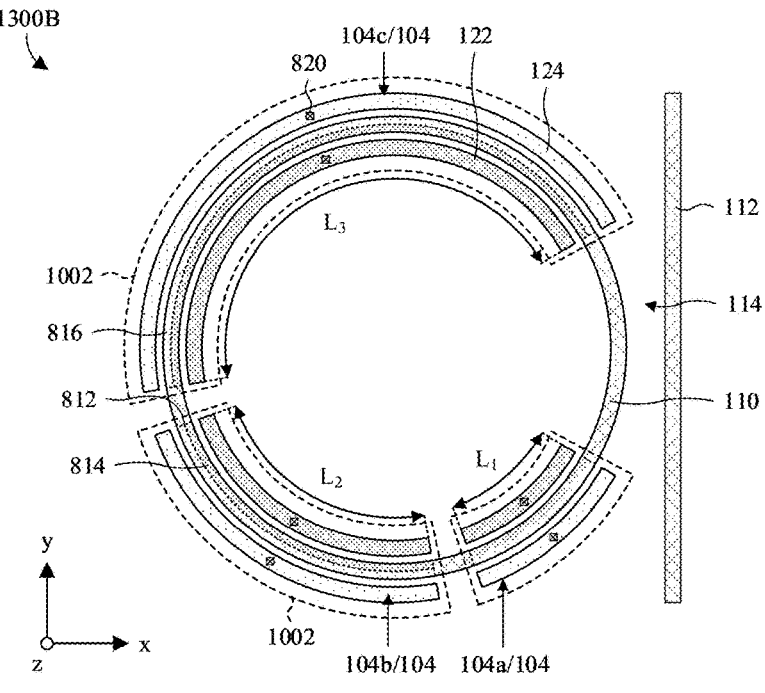

With reference to FIG. 13B, a top layout view 1300B of some alternative embodiments of the OMD of FIG. 13A is provided in which the OMD comprises heaters 1002 (shown in phantom). The heaters 1002 respectively overlap with the plurality of modulator segments 104 and may, for example, be as described with regard to FIGS. 10A-10C. In alternative embodiments, a single heater may overlap with the plurality of modulator segments 104. The single heater may, for example, be disc or ring shaped as described with regard to FIGS. 11B and 11C. Alternatively, the single heater may, for example, have some other suitable layout.

Figure 14:
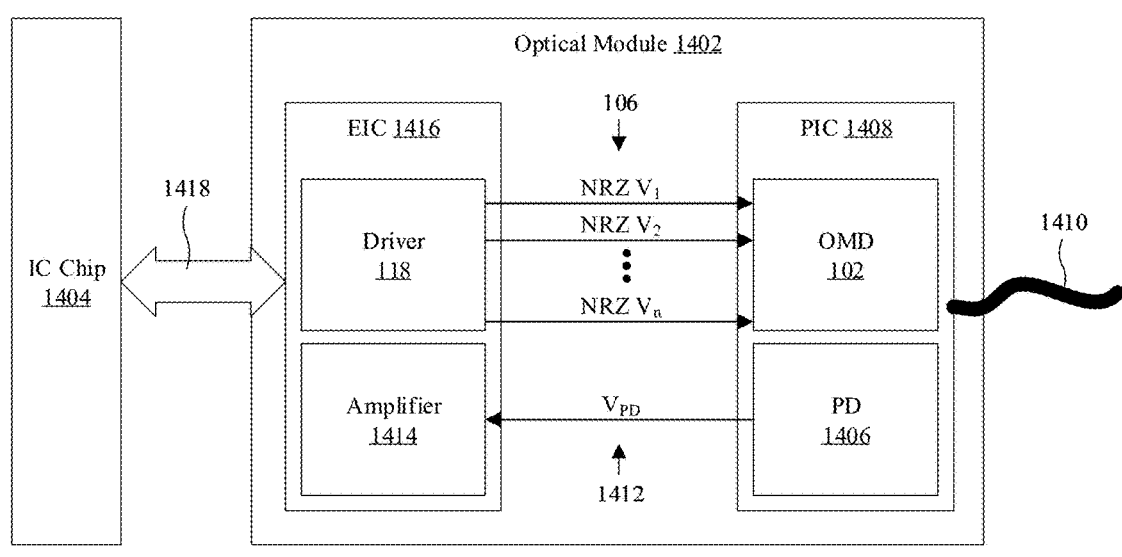
FIG. 14 illustrates a block diagram of some embodiments of an optical module electrically coupled to an integrated circuit (IC) chip and comprising an OMD for PAM with multiple modulator segments.

With reference to FIG. 14, a block diagram 1400 of some embodiments of an optical module 1402 electrically coupled to an integrated circuit (IC) chip 1404 and comprising a OMD 102 with multiple modulator segments (not shown) is provided. The IC chip 1404 may, for example, be or comprise a switch chip, a system-on-chip (SoC) chip, or the like. The SoC chip may, for example, be or comprise an application-specific integrated circuit (ASIC) chip, a central processing unit (CPU) chip, a graphics processing unit (GPU) chip, and so on.

The OMD 102 and a photodetector 1406 form a photonics integrated circuit (PIC) chip 1408 and are electrically coupled to a fiber optic cable 1410. The OMD 102 is configured to convert NRZ electrical signals 106 from a driver 118 to an optical signal to transmit on the fiber optical cable 1410. The photodetector 1406 is configured to convert an optical signal received on the fiber optic cable 1410 to a detected electrical signal 1412 and to provide the detected electrical signal 1412 to amplifiers 1414. The OMD 102 may, for example, be any OMD described above from FIG. 1 to FIG. 13B. For example, the OMD 102 may be as illustrated and described with regard to FIG. 1, FIG. 4, FIG. 6A, FIG. 13A, or the like. The photodetector 1406 may, for example, be or comprise a photodiode or the like.

The driver 118 and the amplifiers 1414 form an electrical integrated circuit (EIC) chip 1416. The driver 118 generates the NRZ electrical signals 106 to drive the OMD 102 in response to electrical signals via a data bus 1418. The amplifiers 1414 amplify the detected electrical signal 1412 and provide the detected electrical signal 1412 to the IC chip 1404 via the data bus 1418. The data bus 1418 may, for example, be or comprise a serial data bus and/or the like. Hence, EIC chip 1416 provides an electrical interface between the IC chip 1404 and the PIC 1408, and the PIC provides an electrical interface between the EIC chip 1416 and the fiber optic cable 1410. The driver 118 and/or the amplifiers 1414 may, for example, be implemented by CMOS devices or the like. The amplifiers 1414 may, for example, be or comprise a transimpedance amplifier, a linear amplifier, the like, or any combination of the foregoing.

With reference to FIGS. 15A and 15B to FIGS. 20A and 20B, a series of views of some embodiments of a method for forming an OMD for PAM is provided in which the OMD comprises a plurality of modulator segments. Figure numbers suffixed with "A" correspond to top views, and figure numbers suffixed with "B" correspond to cross-sectional views along line F-F' for like numbered figures suffixed with "A". The OMD may, for example, correspond to the OMD of FIGS. 10A-10C and may hence achieve PAM-8 modulation of light.

Figure 15A:
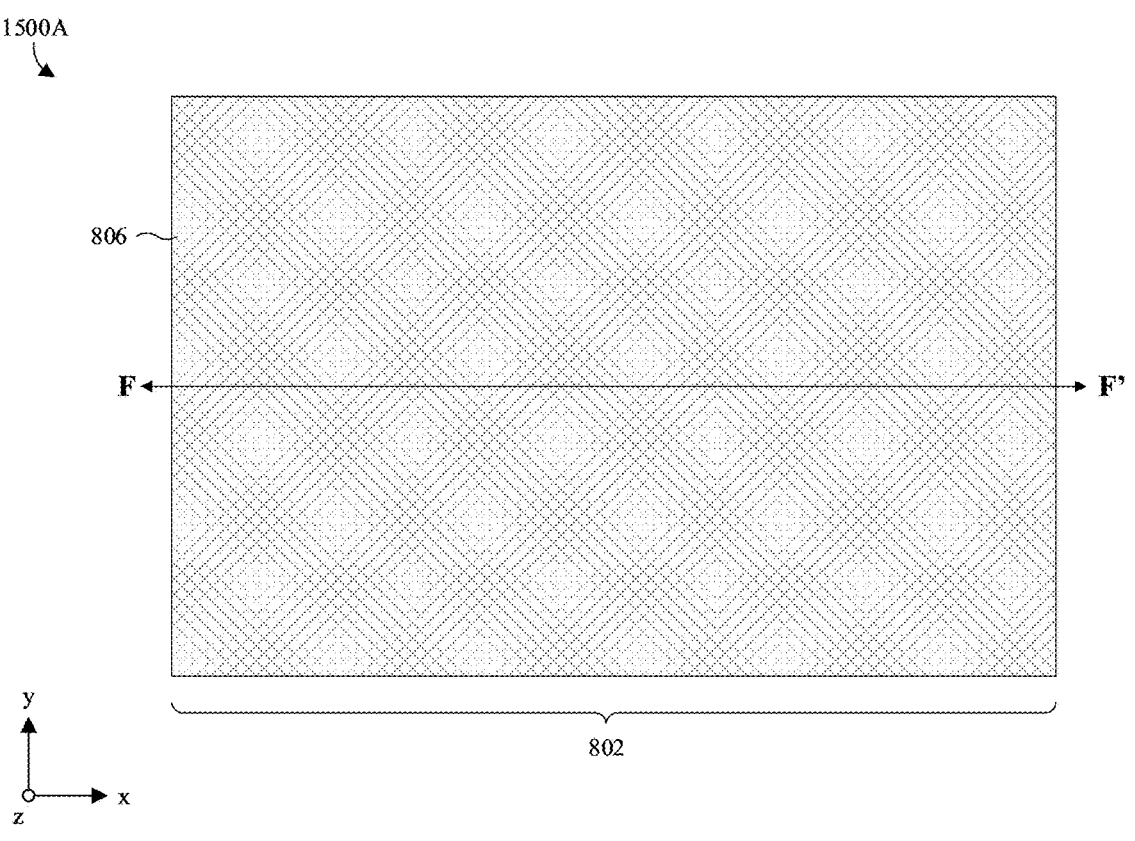
Figure 15B:
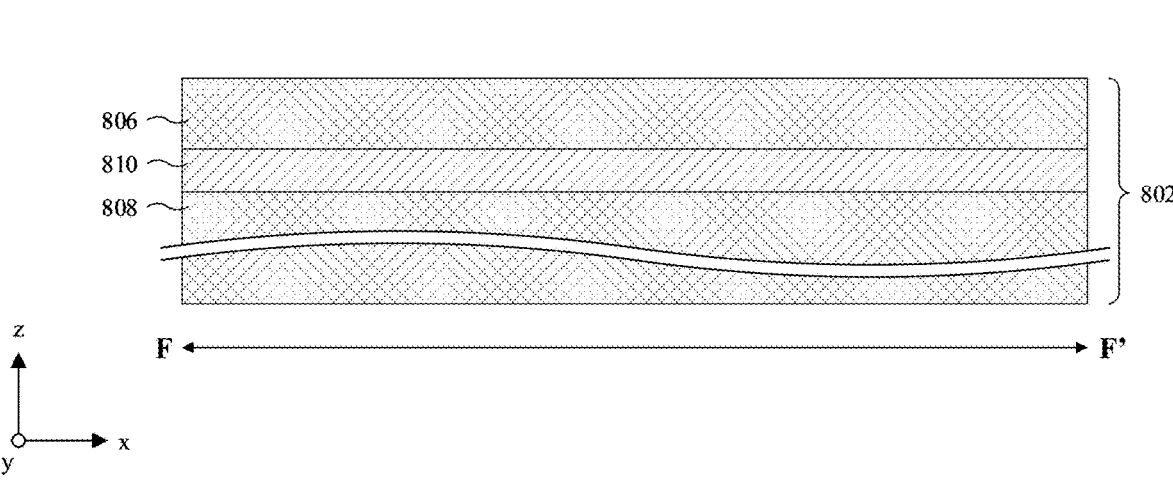

As illustrated by a top view 1500A of FIG. 15A, and a cross-sectional view 1500B of FIG. 15B, a SOI substrate 802 is provided or otherwise formed. The SOI substrate 802 comprises a semiconductor substrate 808, an insulator layer 810 overlying the semiconductor substrate 808, and a semiconductor layer 806 overlying the insulator layer 810. The semiconductor layer 806 is undoped or otherwise lightly doped. The light doping may, for example, be a doping concentration that is less than about 5e16 atoms/cm³ or some other suitable value.

Figure 16A:
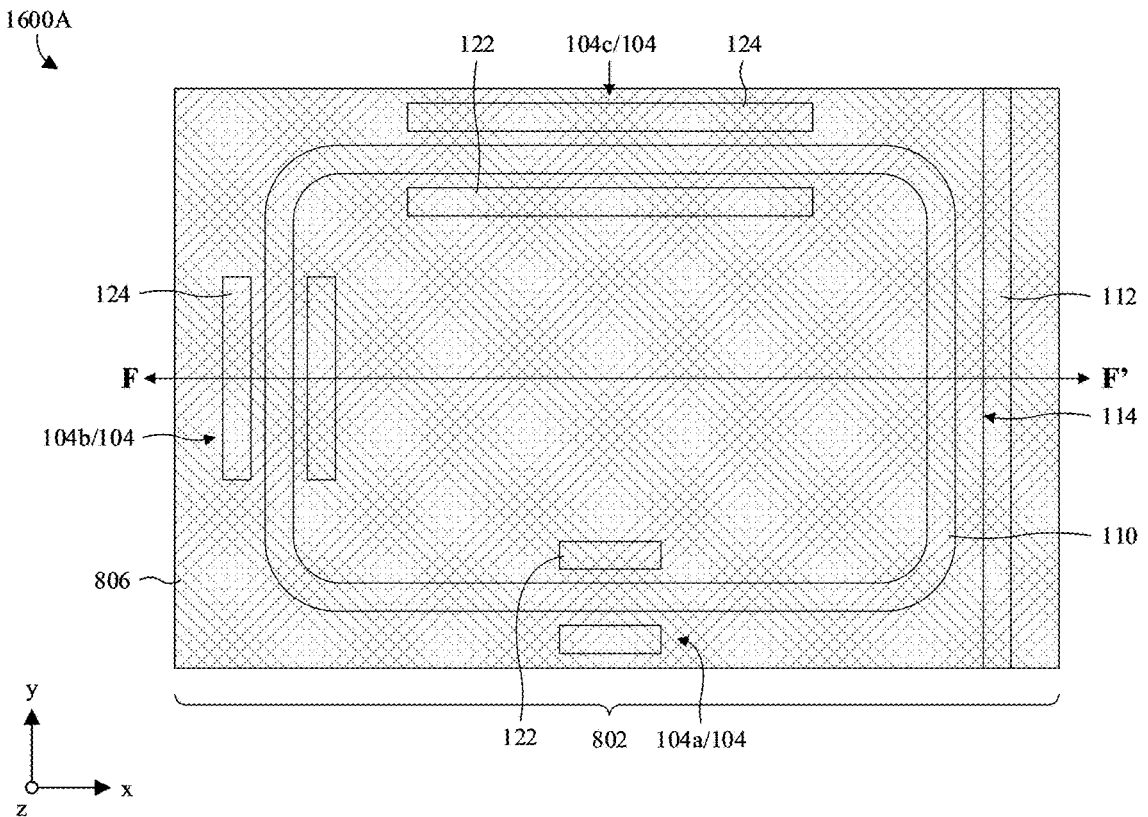
Figure 16B:
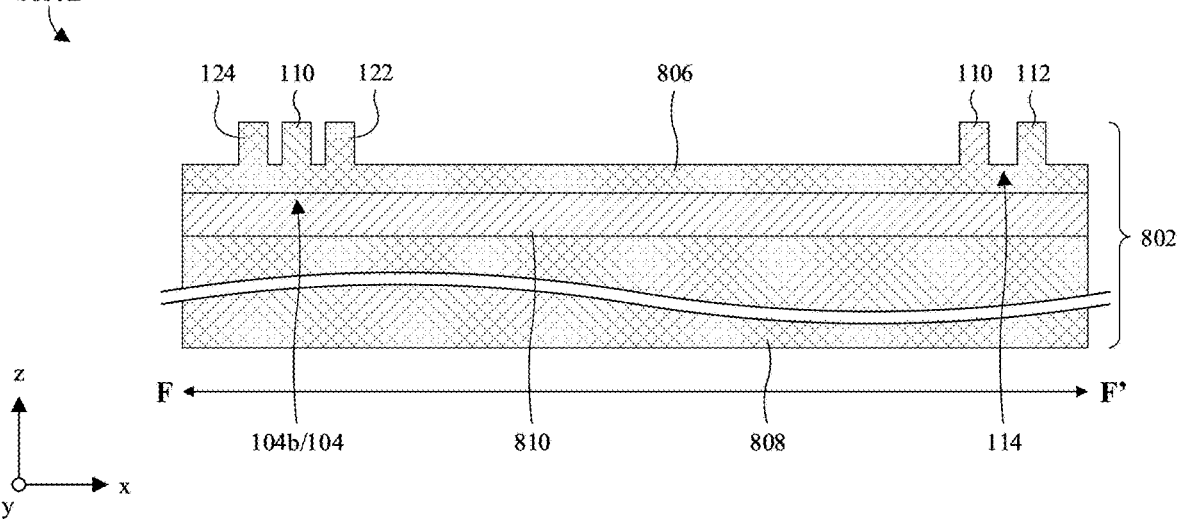

As illustrated by a top view 1600A of FIG. 16A, and a cross-sectional view 1600B of FIG. 16B, the semiconductor layer 806 is patterned to form a ring-shaped waveguide 110 and an input-output waveguide 112. The patterning may, for example, be performed by a photolithography/etching process or some other suitable patterning process.

The ring-shaped waveguide 110 and the input-output waveguide 112 correspond to protrusions along a top of the semiconductor layer 806. The ring-shaped waveguide 110 extends in a closed path around a central area with a square, ring-shaped top geometry. The input-output waveguide 112 borders the ring-shaped waveguide 110 and is optically couples to the ring-shaped waveguide 110 at a coupling area 114. Further, the input-output waveguide 112 has a line-shaped top geometry. In alternative embodiments, the ring-shaped waveguide 110 may have a circular ring-shaped top geometry or some other suitable top geometry and/or the input-output waveguide 112 may have some other suitable top geometry.

Also illustrated by the top view 1600A of FIG. 16A, and the cross-sectional view 1600B of FIG. 16B, the semiconductor layer 806 is further patterned to form inner contact regions 122 and outer contact regions 124. The patterning may, for example, be performed by a photolithography/etching process or some other suitable patterning process.

In some embodiments, the patterning to form the inner contact regions 122 and outer contact regions 124 is performed before or after the patterning to form the ring-shaped waveguide 110 and the input-output waveguide 112. In other embodiments, the patterning to form the inner contact regions 122 and outer contact regions 124 is performed together with the patterning to form the ring-shaped waveguide 110 and the input-output waveguide 112. For example, the same etch process and mask may be used to concurrently form the inner contact regions 122, the outer contact regions 124, the ring-shaped waveguide 110, and the input-output waveguide 112.

The inner contact regions 122 and the outer contact regions 124 are individual to a plurality of modulator segments 104 being formed. The plurality of modulator segments 104 include a first modulator segment 104a, a second modulator segment 104b, and a third modulator segment 104c spaced on the ring-shaped waveguide 110. In alternative embodiments, the plurality of modulator segments 104 may include more or less modulator segments. For example, as in FIG. 1, there may be only two modulator segments.

The inner contact regions 122 and the outer contact regions 124 correspond to protrusions along a top of the semiconductor layer 806. Further, each inner contact region 122 is paired with an outer contact region 124, and vice versa, respectively at the plurality of modulator segments 104 being formed. The inner contact regions 122 are surrounded by the ring-shaped waveguide 110 and border the ring-shaped waveguide 110 along an inner sidewall of the ring-shaped waveguide 110. Further, the outer contact regions 124 are outside the central area surrounded by the ring-shaped waveguide 110 and border the ring-shaped waveguide 110 along an outer sidewall of the ring-shaped waveguide 110.

Figure 17A:
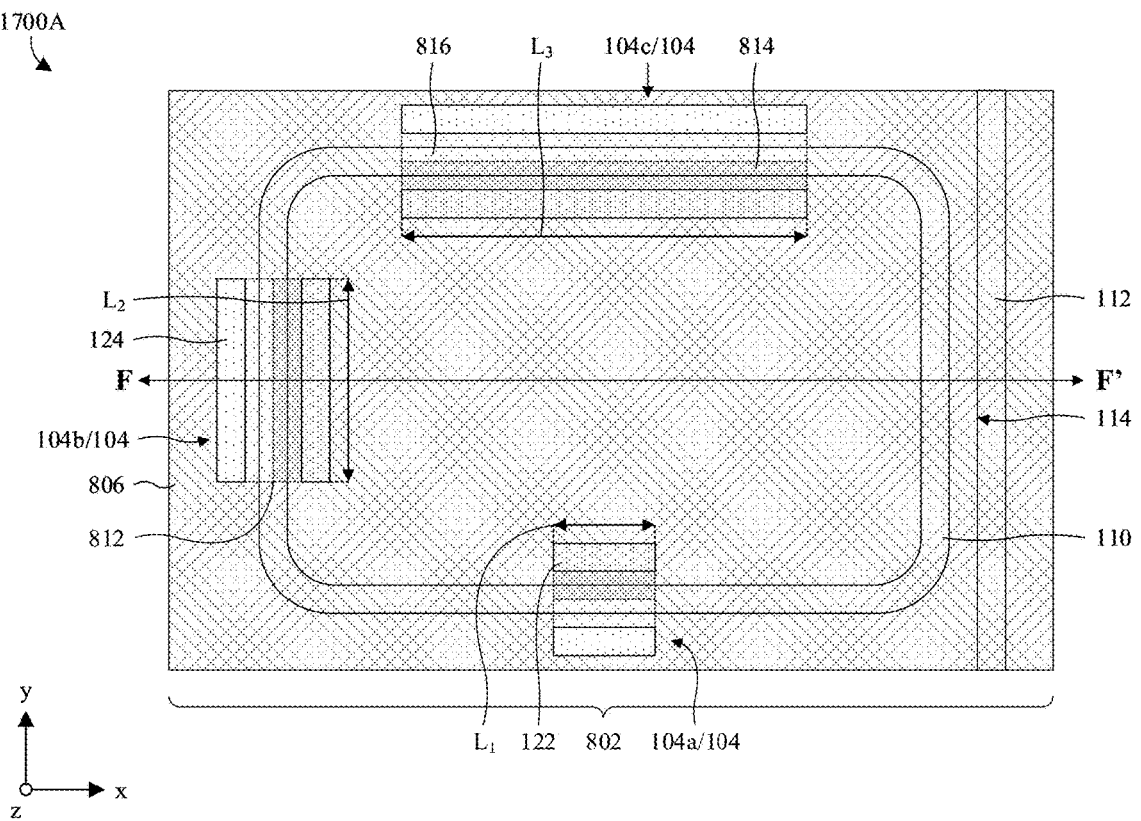
Figure 17B:
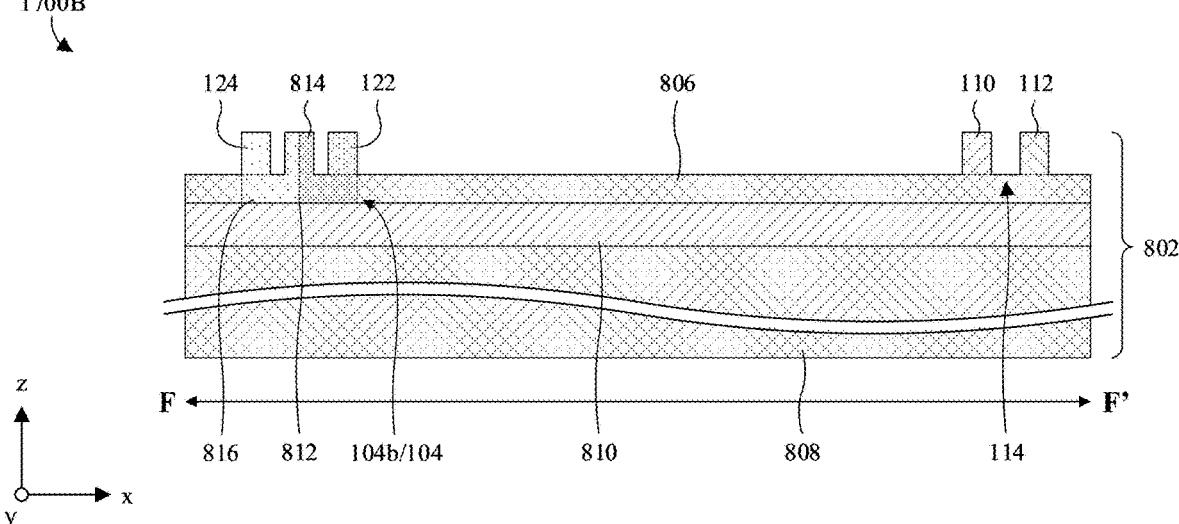

As illustrated by a top view 1700A of FIG. 17A, and a cross-sectional view 1700B of FIG. 17B, the semiconductor layer 806 is doped at the plurality of modulator segments 104 to form PN junctions 812. The doping may, for example, be performed by selective ion implantation with a mask in place or by some other suitable doping process. The mask may, for example, be a photoresist mask or a hard mask.

The PN junctions 812 are individual to the plurality of modulator segments 104 being formed and are in the ring-shaped waveguide 110. As such, the plurality of modulator segments 104 may be regarded as PN junction diodes or the like. By modulating the voltage across the PN junctions 812 (e.g., with the NRZ electrical signals 106 of FIG. 4), a resonant wavelength of the ring-shaped waveguide 110 shifts and an amplitude of the PAM optical signal 108 shifts. The PN junctions 812 may be reverse biased or forward biased.

Each of the plurality of modulator segments 104 has a different length than each other modulator segment. Further, each of the plurality of modulator segments 104, except a shortest modulator segment, has a length along the ring-shaped waveguide 110 that is twice a length of another one of the plurality of modulator segments 104. For example, the first modulator segment 104$a$ has a length $L_1$ that is shortest amongst the plurality of modulator segments 104. Further, the third modulator segment 104$c$ has a length $L_3$ that is twice a length $L_2$ of the second modulator segment 104$b$, which is twice the length $L_1$ of the first modulator segment 104$a$.

Because of the two-to-one length ratios, each of the plurality of modulator segments 104 has a different power factor than each other power modulator. Further, because of the two-to-one length ratios, each of the plurality of modulator segments 104, except the shortest modulator segment, has a power factor that is twice a power factor of another one of the plurality of modulator segments 104. For example, the third modulator segment 104$c$ has a power factor that is twice a power factor of the second modulator segment 104$b$, which is twice a power factor of the first modulator segment 104$a$. The power factor corresponds to an amount that the modulator segment increases an amplitude of a modulated optical signal when ON.

The PN junctions 812 are formed by individual first-doping-type regions 814 and individual second-doping-type regions 816. The first-doping-type regions 814 and the second-doping-type regions 816 are in the semiconductor layer 806 and have opposite doping types. For example, the first-doping-type regions 814 may be P-type, and the second-doping-type regions 816 may be N-type, or vice versa. The first-doping-type regions 814 extend continuously respectively from the PN junctions 812 respectively to the inner contact regions 122. The second-doping-type regions 816 extend continuously respectively from the PN junctions 812 respectively to the outer contact regions 124. In some embodiments, the first-doping-type regions 814 and the second-doping-type regions 816 have higher doping concentrations along a bottom surface of the semiconductor layer 806 than at the ring-shaped waveguide 110.

Also illustrated by the top view 1700A of FIG. 17A, and the cross-sectional view 1700B of FIG. 17B, the inner contact regions 122 and the outer contact regions 124 are doped (as shown by the change in hashing). The doping may, for example, be performed by selective ion implantation with a mask in place or by some other suitable doping process.

The inner contact regions 122 respectively adjoin the first-doping-type regions 814 and are doped with a same doping type as the first-doping-type regions 814. However, the inner contact regions 122 are doped with a higher doping concentration than the first-doping-type regions 814. Hence, the inner contact regions 122 provide contact points for anodes or cathodes of the plurality of modulator segments 104. For example, when P-type, the inner contact regions 122 may provide anode contact points.

The outer contact regions 124 respectively adjoin the second-doping-type regions 816 and are doped with a same doping type as the second-doping-type regions 816. However, the outer contact regions 124 have a higher doping concentration. Hence, the outer contact regions 124 provide contact points for cathodes or anodes of the plurality of modulator segments 104. For example, when N-type, the inner contact regions 122 may provide cathode contact points.

During use of the OMD, the plurality of modulator segments 104 are driven by individual NRZ electrical signals. As such, each modulator segment has two states: an ON state; and an OFF state. In an ON state, a modulator segment increases an amplitude of a corresponding optical signal by a corresponding amount. In an OFF state, a modulator segment passes the corresponding optical signal without affecting the amplitude.

Because the plurality of modulator segments 104 each have two states, and are driven by separate NRZ electrical signals, the OMD has $2^X$ different modulation states, where X is a total number of modulator segments. Further, it has been appreciated that amplitude modulation by the plurality of modulator segments 104 is additive. Because of the amplitude modulation is additive, and because the plurality of modulator segments 104 have different power factors related to each other by powers of 2, the $2^X$ different modulation states correspond to $2^X$ different amplitudes, where X is a total number of modulator segments. Hence, the separate NRZ electrical signals may drive the plurality of modulator segments 104 so as to modulate light into a PAM optical signal with PAM-N, where N is the PAM level and equal to $2^X$.

Figure 18A:
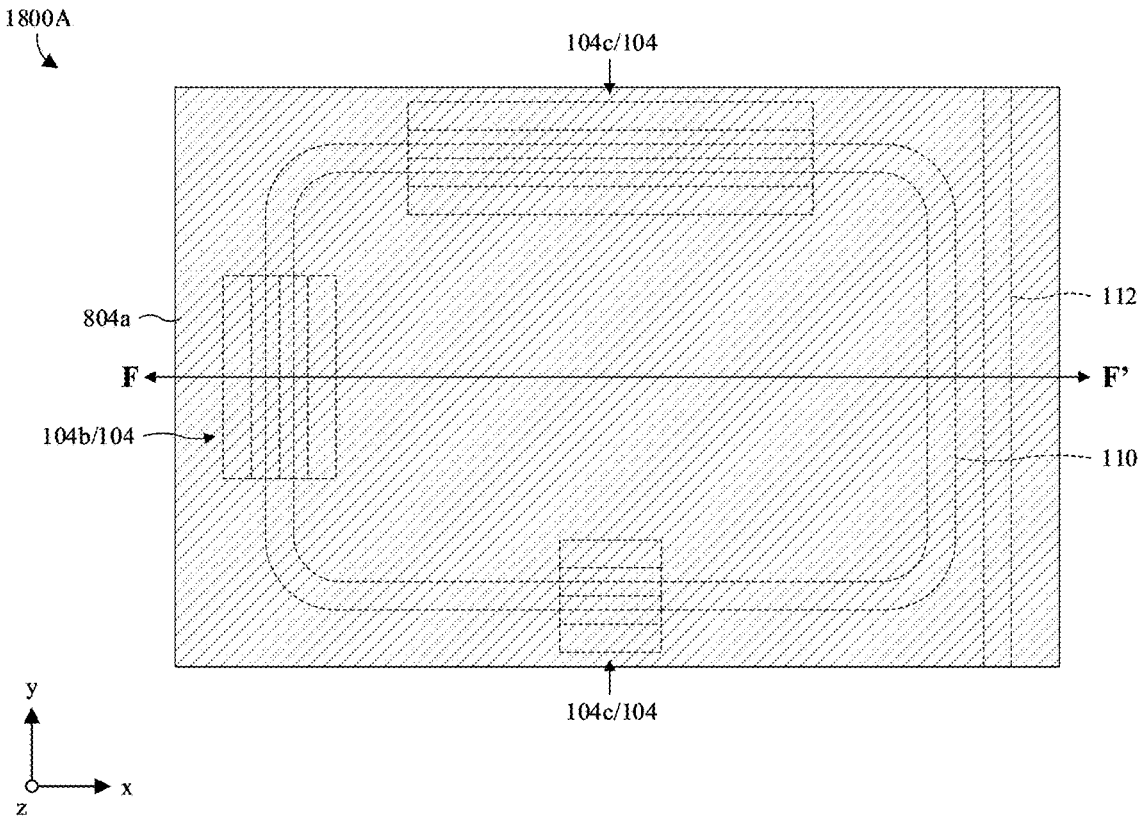
Figure 18B:
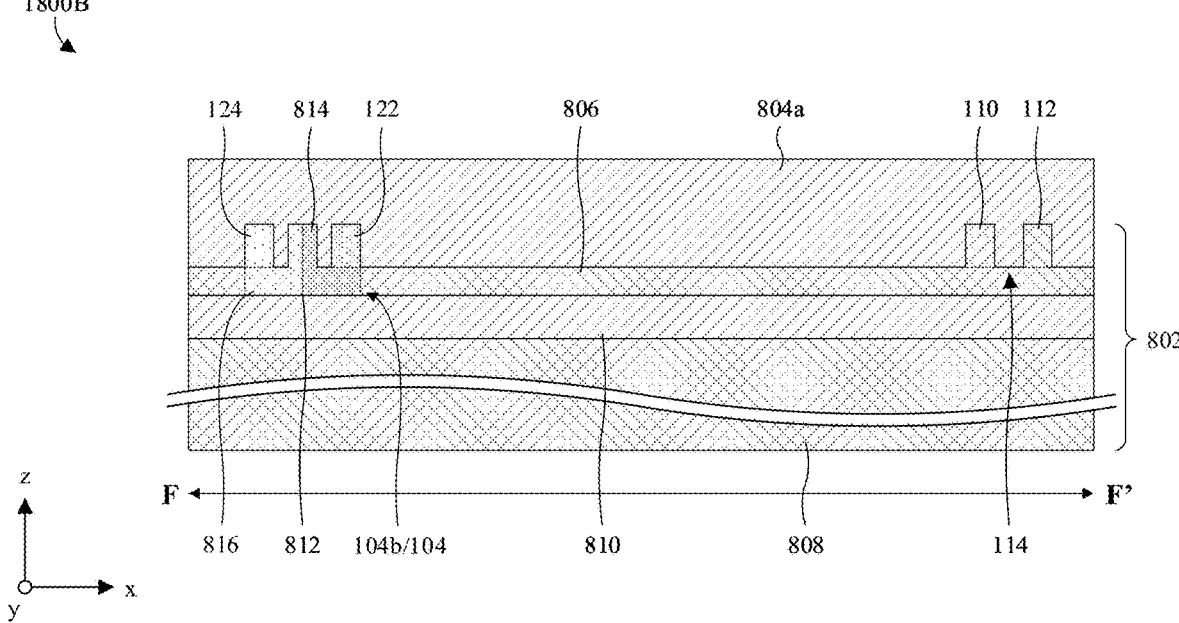

As illustrated by a top view 1800A of FIG. 18A, and a cross-sectional view 1800B of FIG. 18B, a first dielectric layer 804$a$ is deposited over the semiconductor layer 806. The deposition may, for example, be performed by chemical vapor deposition (CVD), physical vapor deposition (PVD), atomic layer deposition (ALD), some other suitable deposition process, or any combination of the foregoing.

Figure 19A:
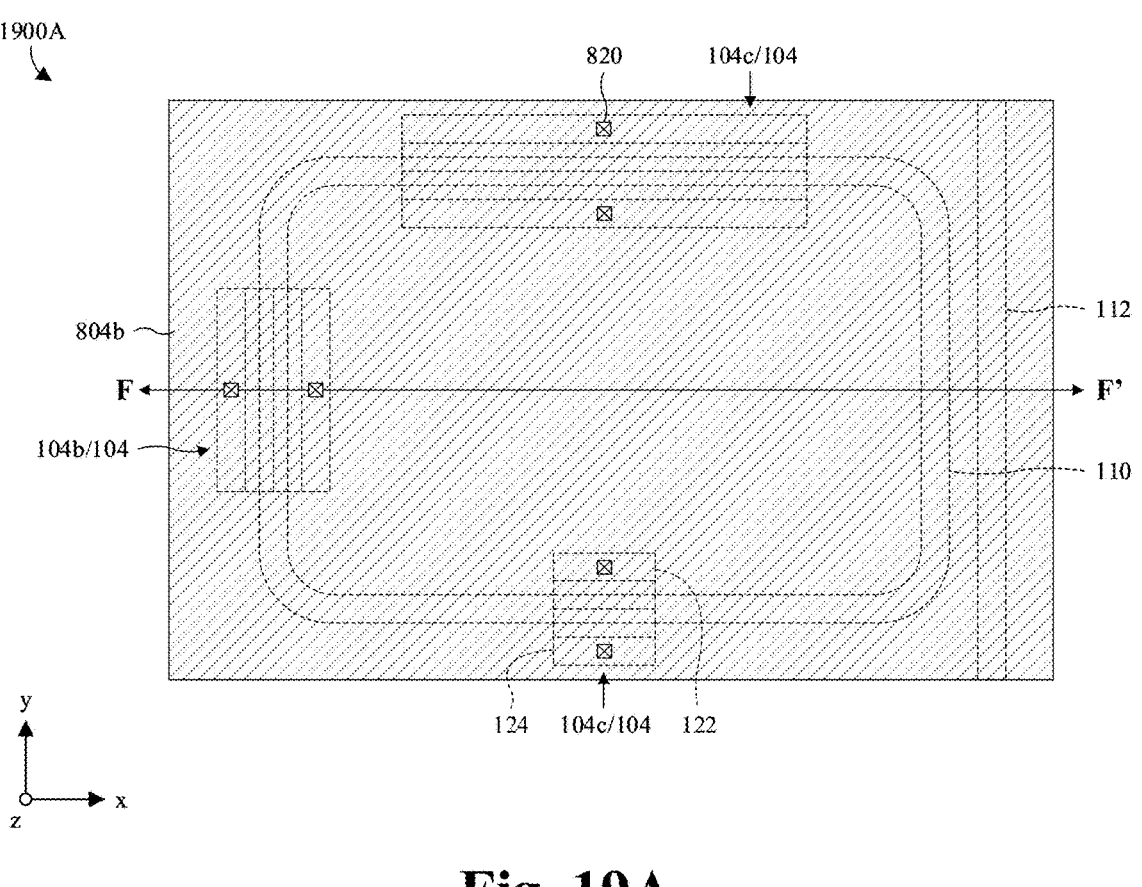
Figure 19B:
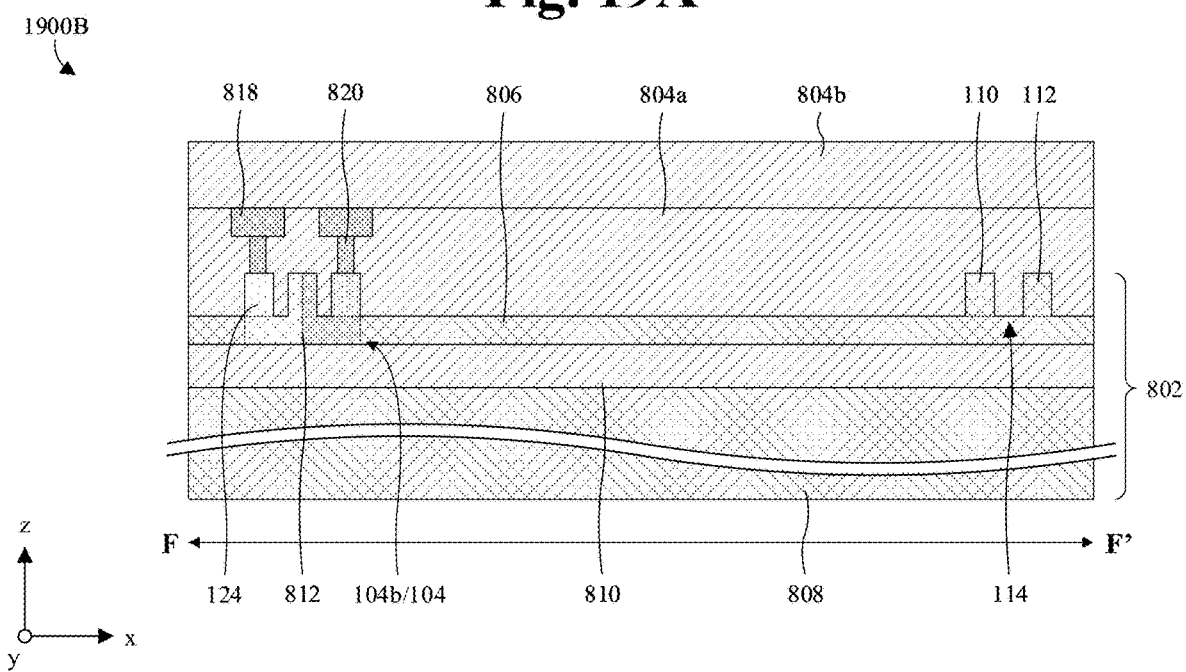

As illustrated by a top view 1900A of FIG. 19A, and a cross-sectional view 1900B of FIG. 19B, a plurality of wires 818 and a plurality of vias 820 are formed in the first dielectric layer 804$a$. The plurality of wires 818 and the plurality of vias 820 are respectively grouped into a wire level and a via level. The via level extends from the inner and outer contact regions 122, 124 to the wire level, and additional wire levels (not shown) and additional via levels (not shown) may be hereafter formed alternatingly stacked over the wire level.

The plurality of wires 818 and the plurality of vias 820 may be formed by a single damascene process or a dual damascene process that repeat. A single damascene process forms a single wire or level, whereas a dual damascene process forms a wire level and a via level. Such damascene processes comprise patterning a dielectric layer (e.g., the first dielectric layer 804*a*) to form openings with layouts of wires and/or vias and filling the openings with metal or some other suitable conductive material. Such filling may, for example, comprise depositing the conductive material in the openings followed by a planarization to remove excess material.

Also illustrated by the top view 1900A of FIG. 19A, and the cross-sectional view 1900B of FIG. 19B, a second dielectric layer 804*b* is deposited over the first dielectric layer 804*a* and the wires 818. The deposition may, for example, be performed by CVD, PVD, ALD, some other suitable deposition process, or any combination of the foregoing.

Figure 20A:
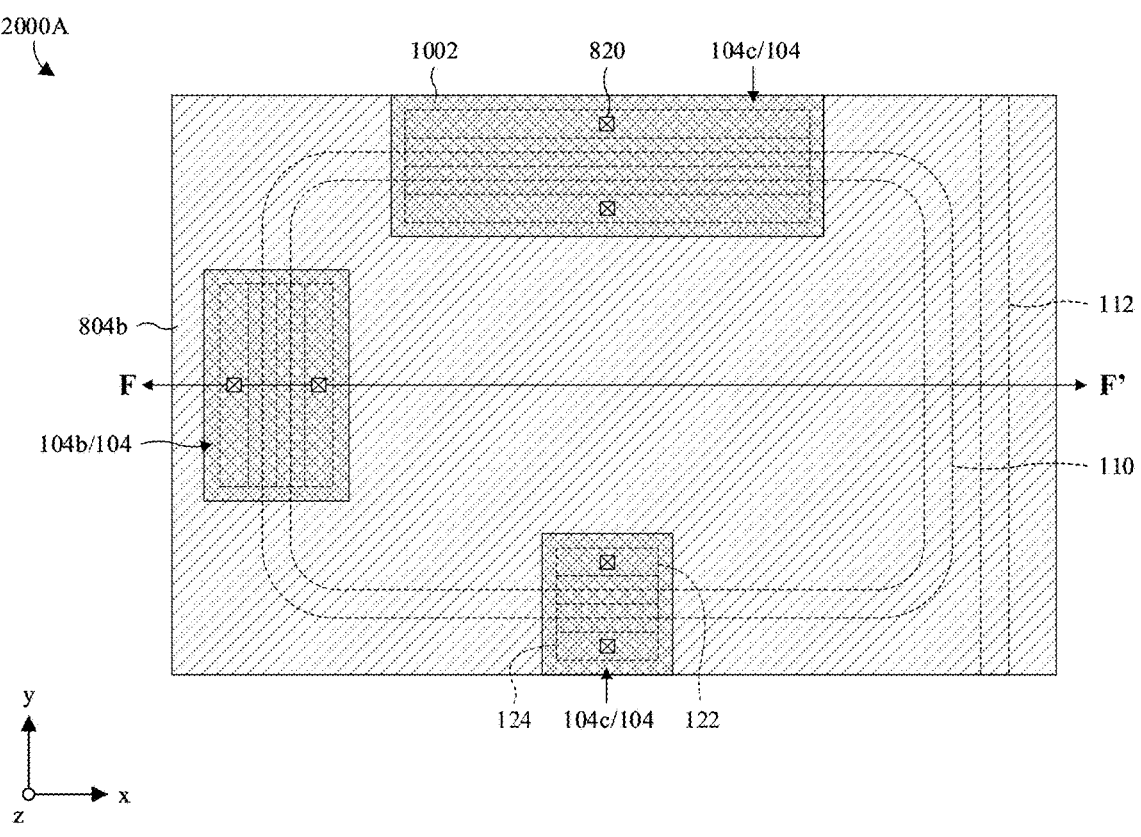
Figure 20B:
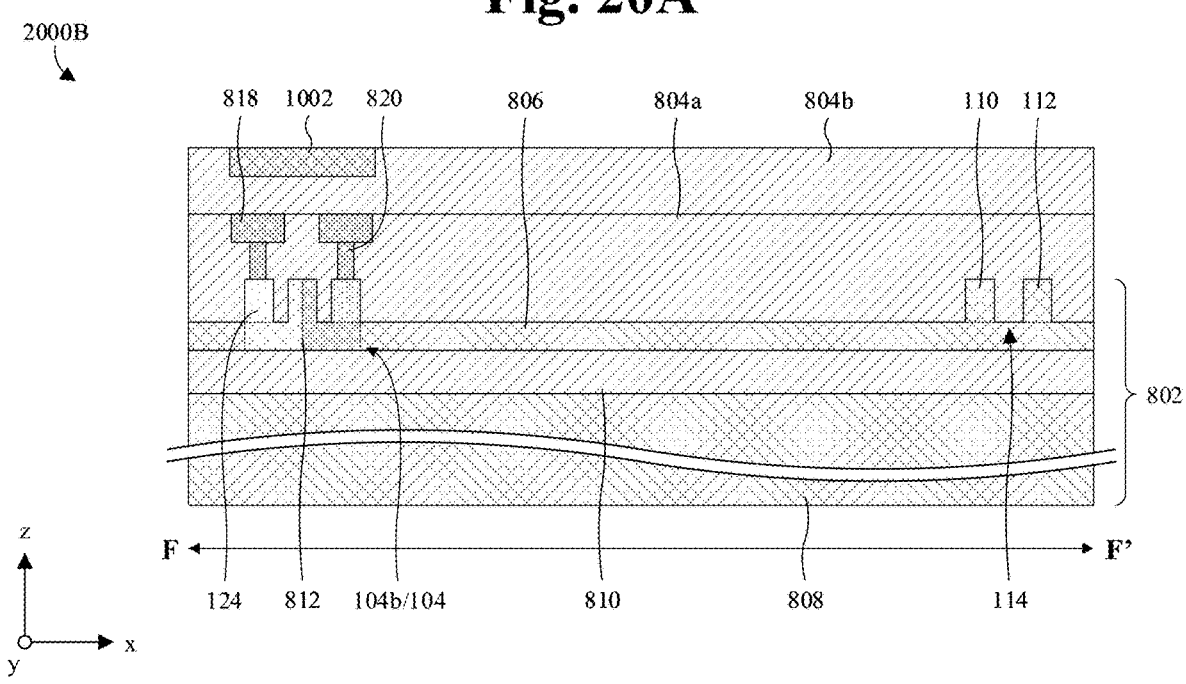

As illustrated by a top view 2000A of FIG. 20A, and a cross-sectional view 2000B of FIG. 20B, a plurality of heaters 1002 are formed in the second dielectric layer 804*b*. Further, while not shown, additional levels of wires 818 and additional levels of vias 820 may be formed alternatingly stacked over the first dielectric layer 804*a*. In alternative embodiments, the heaters 1002 are not formed or are formed with a different layout.

The OMD may suffer from resonant wavelength shift due to manufacturing process variations or real-time temperature variations. Hence, optical amplitude of the PAM optical signal (e.g., the PAM optical signal 108 of FIG. 4) generated by the OMD may vary with temperature and manufacturing variations. The heaters 1002 may selectively heat the ring-shaped waveguide 110 to compensate for the resonant wavelength shift. Further, by having multiple heaters, local variations may be compensated for.

The heaters 1002 are individual to and respectively overlie the plurality of modulator segments 104. The heaters 1002 may, for example, be resistive heaters and/or some other suitable type of heater. For example, to the extent that the heaters 1002 are resistive heaters, the heaters 1002 may be or comprise titanium nitride or some other suitable material with a high resistance. Such a high resistance may, for example, be a resistance that is high relative to a resistance of the plurality of wires 818 and/or a resistance of the plurality of vias 820.

The heaters 1002 may, for example, be formed by patterning the second dielectric layer 804*b* to form heater openings and subsequently filling the heater openings with a high-resistance material (e.g., titanium nitride or the like). Such filling may, for example, comprise depositing the high-resistance material in the heater openings followed by a planarization to remove excess material outside the heater openings.

While FIGS. 15A and 15B to FIGS. 20A and 20B are described with reference to a method, it will be appreciated that the structures shown in these figures are not limited to the method but rather may stand alone separate of the method. While FIGS. 15A and 15B to FIGS. 20A and 20B are described as a series of acts, it will be appreciated that the order of the acts may be altered in other embodiments. While FIGS. 15A and 15B to FIGS. 20A and 20B illustrate and describe as a specific set of acts, some acts that are illustrated and/or described may be omitted in other embodiments. Further, acts that are not illustrated and/or described may be included in other embodiments.

With reference to FIG. 21, a block diagram of some embodiments of the method of FIGS. 15A and 15B to FIGS. 20A and 20B is provided.

At 2102, a substrate comprising a semiconductor layer is provided or otherwise formed. See, for example, FIGS. 15A and 15B.

At 2104, the semiconductor layer is patterned to form a ring-shaped waveguide and an input-output waveguide bordering and optically coupled to the ring-shaped waveguide. See, for example, FIGS. 16A and 16B.

At 2106, the semiconductor layer is patterned to form inner contact regions and outer contact regions individual to a plurality of modulator segments spaced along the ring-shaped waveguide. See, for example, FIGS. 16A and 16B.

At 2108, the semiconductor layer is doped to form PN junctions individual to the plurality of waveguide segments and in the ring-shaped waveguide. See, for example, FIGS. 17A and 17B.

At 2110, the inner and outer contact regions are heavily doped, such that inner and outer contact regions facilitate electrical coupling to an anodes and cathodes of the PN junctions. See, for example, FIGS. 17A and 17B.

At 2112, a first dielectric layer is deposited overlying the plurality of modulator segments. See, for example, FIGS. 18A and 18B.

At 2114, a plurality of wires and a plurality of vias are formed stacked over the plurality of modulator segments, in the first dielectric layer, and electrically coupled to the plurality of modulator segments through the inner and outer contact regions. See, for example, FIGS. 19A and 19B.

At 2116, a second dielectric layer is deposited overlying the plurality of wires. See, for example, FIGS. 19A and 19B.

At 2118, a plurality of heaters are formed in the second dielectric layer, the plurality of heaters individual to and respectively overlying the plurality of modulator segments. See, for example, FIGS. 20A and 20B.

While the block diagram 2100 of FIG. 21 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

In some embodiments, the present disclosure provides an optical module, including: an optical modulator including a ring-shaped waveguide, and further including a first modulator segment and a second modulator segment spaced from each other along the ring-shaped waveguide; and a driver circuit electrically coupled separately to the first modulator segment and the second modulator segment; wherein a length of the second modulator segment along the ring-shaped waveguide is twice a length of the first modulator segment along the ring-shaped waveguide.

In some embodiments, the present disclosure provides another optical module, including: a semiconductor layer having a ring-shaped waveguide extending in a closed path; and a first optical modulator and a second optical modulator spaced along the ring-shaped waveguide and respectively including a first PN junction and a second PN junction in the ring-shaped waveguide; wherein the first optical modulator is separated from the second optical modulator by an undoped region of the ring-shaped waveguide, and the second optical modulator has a power factor that is two times a power factor of the first optical modulator.

In some embodiments, the present disclosure provides a method for forming an optical module, including: patterning a semiconductor layer to form a ring-shaped waveguide in the semiconductor layer; doping the semiconductor layer to form a first modulator and a second modulator spaced from each other along the ring-shaped waveguide, wherein the first and the second modulators respectively have a first PN junction and a second PN junction in the ring-shaped waveguide; depositing a dielectric layer covering the semiconductor layer, as well as the first and second modulators; and forming contact vias extending through the dielectric layer respectively to the first and second modulators; wherein the second PN junction has a length along the ring-shaped waveguide that is two times a length of the first PN junction, and wherein the ring-shaped waveguide is undoped between the first PN junction and the second PN junction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an optical module, comprising:
patterning a semiconductor layer to form a ring-shaped waveguide in the semiconductor layer;
doping the semiconductor layer to form a first modulator, a second modulator, and a third modulator spaced from each other along the ring-shaped waveguide, wherein the first, second, and third modulators respectively have a first PN junction, a second PN junction, and a third PN junction in the ring-shaped waveguide;
depositing a dielectric layer covering the semiconductor layer, as well as the first and second modulators;
forming contact vias extending through the dielectric layer respectively to the first and second modulators; and
forming a heater covering the second PN junction and laterally offset from the first and third PN junctions;
wherein the second PN junction has a length along the ring-shaped waveguide that is two times a length of the first PN junction, wherein the heater has a length along the ring-shaped waveguide that is greater than the length of the first PN junction and that is less than a length of the third PN junction, and wherein the ring-shaped waveguide is undoped between the first PN junction and the second PN junction.

2. The method according to claim 1, further comprising:
patterning the semiconductor layer to further form an input-output waveguide bordering and coupled to the ring-shaped waveguide to form a ring resonator.

3. The method according to claim 1, further comprising:
patterning the semiconductor layer to form a pair of protrusions in the semiconductor layer, wherein the ring-shaped waveguide is between and borders the pair of protrusions, wherein an N-type region of the second PN junction extends from the ring-shaped waveguide to one of the protrusions, wherein a P-type region of the second PN junction extends from the ring-shaped waveguide to another one of the protrusions, and wherein the heater completely covers the pair of protrusions.

4. The method according to claim 1, further comprising:
forming a complementary metal-oxide-semiconductor (CMOS) driver; and
electrically coupling the CMOS driver to the first modulator and the second modulator, wherein the CMOS driver is configured to electrically drive the first modulator and the second modulator with separate non-return-to-zero (NRZ) signals.

5. The method according to claim 1, wherein the length of the third PN junction along the ring-shaped waveguide is two times the length of the second PN junction.

6. A method for forming an optical module, comprising:
patterning a semiconductor layer to form a ring-shaped waveguide extending laterally in a closed path and in the semiconductor layer, wherein the ring-shaped waveguide has a plurality of outer sidewalls;
doping the semiconductor layer to form a first modulator, a second modulator, and a third modulator spaced from each other along the closed path, wherein the first, second, and third modulators respectively have a first PN junction, a second PN junction, and a third PN junction in the ring-shaped waveguide, and wherein the first, second, and third PN junctions are localized along different sidewalls of the plurality of outer sidewalls;
forming a complementary metal-oxide-semiconductor (CMOS) driver; and
electrically coupling the CMOS driver to the first modulator and the second modulator, wherein the CMOS driver is configured to electrically drive the first modulator and the second modulator with separate non-return-to-zero (NRZ) signals.

7. The method according to claim 6, wherein the second modulator has a power factor that is two times a power factor of the first modulator.

8. The method according to claim 6, further comprising:
forming a plurality of heaters respectively overlying the first and second modulators, wherein the plurality of heaters have different lengths along the ring-shaped waveguide.

9. The method according to claim 6, wherein the CMOS driver, the ring-shaped waveguide, and the first and second modulators are configured to generate an optical pulse amplitude modulation (PAM) signal in an input-output waveguide bordering and coupled to the ring-shaped waveguide.

10. A method for forming an optical module, comprising:
patterning a semiconductor layer to form a ring-shaped waveguide in the semiconductor layer;
patterning the semiconductor layer to further form an input-output waveguide bordering and coupled to an undoped portion of the ring-shaped waveguide;
doping the semiconductor layer to form a first modulator and a second modulator spaced from each other along the ring-shaped waveguide, wherein the first and the second modulators respectively have a first PN junction and a second PN junction in the ring-shaped waveguide;
depositing a dielectric layer overlying the semiconductor layer;
patterning the dielectric layer to form a first opening and a second opening respectively overlying the first and second modulators and laterally offset from the input-output waveguide when viewed top down;

depositing a heater layer overlying the dielectric layer and filling the first and second openings; and performing a planarization into the heater layer to form a first heater and a second heater respectively in the first and second openings, wherein the second heater has a length along the ring-shaped waveguide that is about two times a length of the first heater.

11. The method according to claim 10, wherein the doping forms a third modulator in the ring-shaped waveguide, spaced from the first and second modulators, and wherein the patterning of the dielectric layer, the depositing of the heater layer, and the planarization form a third heater overlying the third modulator and having a length along the ring-shaped waveguide that is about two times the length of the second heater.

12. The method according to claim 10, wherein the ring-shaped waveguide and the input-output waveguide are formed by a common etching process.

13. The method according to claim 10, wherein the ring-shaped waveguide is continuous in a closed path and is continuous from the first modulator to the second modulator.

14. The method according to claim 1, wherein the heater is separated from the second PN junction by the contact vias.

15. The method according to claim 1, further comprising:

forming a first additional heater and a second additional heater completely and respectively covering the first and third modulators, wherein the first and second additional heaters have individual lengths along the ring-shaped waveguide that are respectively greater than the length of the first PN junction and the length of the third PN junction.

16. The method according to claim 6, further comprising:

forming a fourth modulator comprising a fourth PN junction in the ring-shaped waveguide and localized along the same sidewall of the plurality of outer side-walls as the first PN junction.

17. The method according to claim 6, wherein the first and third modulators are respectively on opposite sides of the ring-shaped waveguide and have length-wise centers over-lapping with an axis extending orthogonal to the closed path.

18. The method according to claim 6, further comprising:

forming a heater completely covering the second PN junction and laterally offset from the first and third PN junctions, wherein the heater has a length along the ring-shaped waveguide that is greater than a length of the first PN junction and that is less than a length of the third PN junction.

19. The method according to claim 11, wherein the length of the second heater along the ring-shaped waveguide is greater than a length of the first modulator and is less than a length of the third modulator.

20. The method according to claim 10, further compris-ing:

forming a first conductive wire and a second conductive wire overlying the first modulator, wherein the first and second conductive wires partially separate the first heater from the first modulator.

* * * * *